United States Patent
Oku

(10) Patent No.: US 9,955,234 B2
(45) Date of Patent: Apr. 24, 2018

(54) IMAGE RECEPTION APPARATUS, PARAMETER SETTING METHOD, AND ADDITIONAL INFORMATION DISPLAYING SYSTEM INCLUDING A CALIBRATION OPERATION

(71) Applicant: Panasonic Intellectual Property Management Co., Ltd., Osaka (JP)

(72) Inventor: Hirotaka Oku, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/036,804

(22) PCT Filed: Oct. 24, 2014

(86) PCT No.: PCT/JP2014/005405
§ 371 (c)(1),
(2) Date: May 14, 2016

(87) PCT Pub. No.: WO2015/145501
PCT Pub. Date: Oct. 1, 2015

(65) Prior Publication Data
US 2016/0286283 A1 Sep. 29, 2016

(30) Foreign Application Priority Data
Mar. 28, 2014 (JP) .................. 2014-068198

(51) Int. Cl.
*H04N 21/81* (2011.01)
*G06F 17/30* (2006.01)
(Continued)

(52) U.S. Cl.
CPC ... *H04N 21/8133* (2013.01); *G06F 17/30247* (2013.01); *G06F 17/30799* (2013.01);
(Continued)

(58) Field of Classification Search
CPC ............. H04N 21/8133; H04N 21/654; H04N 21/23418; H04N 21/44008;
(Continued)

(56) References Cited

U.S. PATENT DOCUMENTS

2003/0051252 A1 3/2003 Miyaoku et al.
2006/0259938 A1 11/2006 Kinoshita et al.
(Continued)

FOREIGN PATENT DOCUMENTS

JP 10-214258 8/1998
JP 2002-209204 7/2002
(Continued)

OTHER PUBLICATIONS

International Search Report of PCT application No. PCT/JP2014/005405 dated Jan. 27, 2015.

*Primary Examiner* — Hoang Vu A Nguyen Ba
(74) *Attorney, Agent, or Firm* — McDermott Will & Emery LLP

(57) ABSTRACT

The video receiving apparatus is capable of transmitting and receiving data via a communications network. The video receiving apparatus includes a video extractor, a controller, a calibration executor, and an input unit to which a video signal is input. The video extractor extracts a partial video, which is to be used for video recognition processing, from the video signal. The controller controls the following operations: That is, the controller transmits, to a video recognition apparatus, either the partial video or content recognition information formed from the partial video, thereby requesting the video recognition apparatus to perform the video recognition processing. The controller acquires a result of the video recognition processing from the video recognition apparatus, and acquires the additional information based on the video recognition processing from an additional-information delivering apparatus. The calibra-
(Continued)

tion executor performs calibration processing in cooperation with the video recognition apparatus, thereby setting the predetermined parameter.

17 Claims, 17 Drawing Sheets

(51) Int. Cl.
| | |
|---|---|
| H04N 9/82 | (2006.01) |
| H04N 7/088 | (2006.01) |
| G06K 9/00 | (2006.01) |
| H04N 21/45 | (2011.01) |
| H04N 21/235 | (2011.01) |
| H04N 21/84 | (2011.01) |
| H04N 5/14 | (2006.01) |
| H04N 21/472 | (2011.01) |
| G06K 9/32 | (2006.01) |
| H04N 5/232 | (2006.01) |
| H04N 21/654 | (2011.01) |
| H04N 21/658 | (2011.01) |
| H04N 21/6547 | (2011.01) |
| H04N 21/61 | (2011.01) |
| H04N 21/44 | (2011.01) |
| H04N 21/234 | (2011.01) |
| H04H 60/65 | (2008.01) |
| H04H 60/59 | (2008.01) |
| H04N 21/462 | (2011.01) |
| H04N 21/4722 | (2011.01) |

(52) U.S. Cl.
CPC .. *G06F 17/30811* (2013.01); *G06F 17/30837* (2013.01); *G06K 9/00221* (2013.01); *G06K 9/00711* (2013.01); *G06K 9/3258* (2013.01); *H04H 60/59* (2013.01); *H04H 60/65* (2013.01); *H04N 5/147* (2013.01); *H04N 5/23219* (2013.01); *H04N 7/0887* (2013.01); *H04N 9/8211* (2013.01); *H04N 21/235* (2013.01); *H04N 21/23418* (2013.01); *H04N 21/44008* (2013.01); *H04N 21/45* (2013.01); *H04N 21/4622* (2013.01); *H04N 21/472* (2013.01); *H04N 21/4722* (2013.01); *H04N 21/6112* (2013.01); *H04N 21/6125* (2013.01); *H04N 21/654* (2013.01); *H04N 21/658* (2013.01); *H04N 21/6547* (2013.01); *H04N 21/6581* (2013.01); *H04N 21/84* (2013.01)

(58) Field of Classification Search
CPC ........... H04N 21/4622; H04N 21/6112; H04N 21/6547; H04N 21/658; H04N 21/6581; H04N 21/6125; H04N 21/4722; H04N 7/0887; H04N 9/8211; H04N 21/235; H04N 5/147; H04N 5/23219; H04N 21/472; H04N 21/45; H04H 60/65; H04H 60/59; G06F 17/30837; G06F 17/30811; G06F 17/30247; G06F 17/3079; G06K 9/00221; G06K 9/3258; G06K 9/00711
See application file for complete search history.

(56) References Cited

U.S. PATENT DOCUMENTS

| | | | |
|---|---|---|---|
| 2007/0109449 | A1 | 5/2007 | Cheung |
| 2007/0168409 | A1 | 7/2007 | Cheung |
| 2008/0175486 | A1* | 7/2008 | Yamamoto ......... G06K 9/00711 382/206 |
| 2008/0263041 | A1 | 10/2008 | Cheung |
| 2009/0006337 | A1 | 1/2009 | Cheung |
| 2010/0008643 | A1* | 1/2010 | Rakib ............... G06F 17/30799 386/341 |
| 2010/0225810 | A1 | 9/2010 | Berkvens et al. |
| 2011/0110515 | A1* | 5/2011 | Tidwell ............ H04N 21/23109 380/200 |
| 2013/0318096 | A1 | 11/2013 | Cheung |

FOREIGN PATENT DOCUMENTS

| | | |
|---|---|---|
| JP | 2004-289776 | 10/2004 |
| JP | 2007-534008 | 11/2007 |
| JP | 2010-532943 | 10/2010 |
| JP | 2012-161030 | 8/2012 |
| WO | 2005/081829 | 9/2005 |
| WO | 2009/007874 | 1/2009 |

* cited by examiner

FIG. 4

| | Installation area | Calibration-available channel |
|---|---|---|
| Japan | Tokyo | CH## <br> CH&& |
| | Osaka | CH$$ <br> CH§§ |
| | Other areas | CH££ |

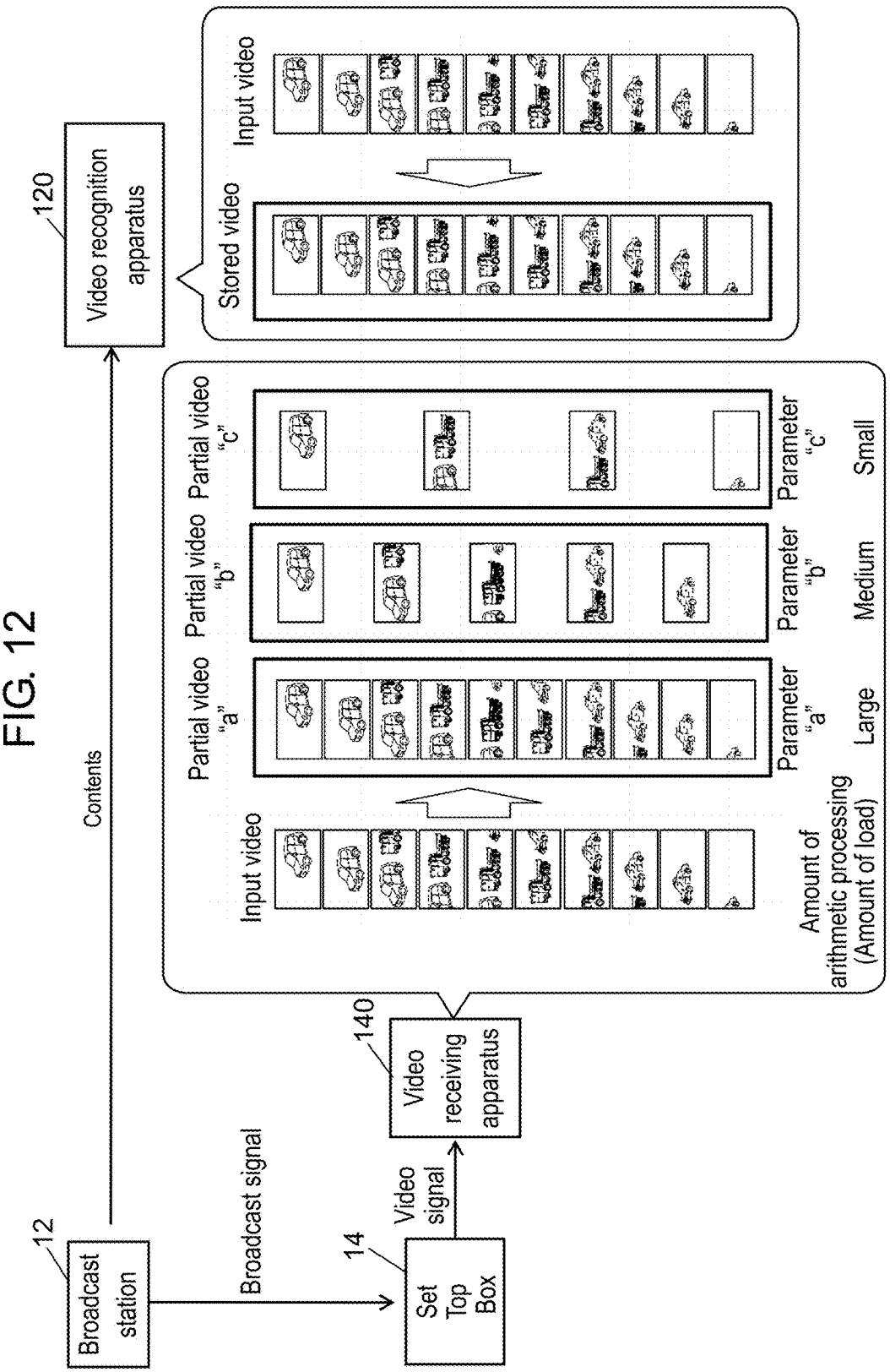

IMAGE RECEPTION APPARATUS, PARAMETER SETTING METHOD, AND ADDITIONAL INFORMATION DISPLAYING SYSTEM INCLUDING A CALIBRATION OPERATION

TECHNICAL FIELD

The present disclosure relates to video receiving apparatuses for acquiring additional information concerning video signals which are fed from the outside, and then superimposing the information on the video signals.

BACKGROUND ART

Patent Literature 1 discloses a data processing system. In the system, a client apparatus transmits video data to a server, serving as a video recognition apparatus, via a network to make a request for video recognition processing. The server performs the video recognition processing in accordance with the received video data, and transmits the result of the video recognition to the client apparatus via the network.

Patent Literature 2 discloses a technology for automating a procedure of monitoring broadcast programs by using a computer system.

Patent Literature 2 discloses a method, in a multimedia system, for synchronizing a content stream with one script or a plurality of scripts.

CITATION LIST

Patent Literature

PTL 1: Japanese Patent Unexamined Publication No. H10-214258
PTL 2: Japanese Translation of PCT Publication No. 2007-534008
PTL 3: Japanese Translation of PCT Publication No. 2010-532943

SUMMARY

The present disclosure is intended to provide a video receiving apparatus, a method of setting a parameter, and an additional information display system, which each are advantageous in controlling both acquisition of an additional information associated with a video signal that is inputted from the outside and superimposition of the acquired additional information on the video signal.

The video receiving apparatus according to the present disclosure is configured to be capable of transmitting and receiving data via a communications network. The video receiving apparatus includes an input unit, a video extractor, a controller, and a calibration executor. The input unit is configured to be input with a video signal that is output from a video transmitting apparatus installed on the outside. The video extractor is configured to extract a partial video, which is to be used for video recognition processing, from the video signal. The controller is configured to control the following operations: That is, the controller transmits, to a video recognition apparatus connected to the communications network, either the partial video or content recognition information formed from the partial video, thereby requesting the video recognition apparatus to perform the video recognition processing. Then, the controller acquires a result of the video recognition processing from the video recognition apparatus, and acquires the additional information based on the video recognition processing from an additional-information delivering apparatus connected to the communications network. The calibration executor performs calibration processing in cooperation with the video recognition apparatus, thereby setting the predetermined parameter.

The method according to the present disclosure is one for setting a parameter in a video receiving apparatus that is configured to be capable of transmitting and receiving data via a communications network. The method includes the following steps: That is, a step of extracting a partial video, which is to be used for video recognition processing, from a video signal that is inputted from the outside; steps of transmitting, to a video recognition apparatus connected to the communications network, either the partial video or content recognition information which is formed from the partial video, requesting the video recognition apparatus to perform the video recognition processing, and then acquiring a result of the video recognition processing from the video recognition apparatus; a step of acquiring additional information based on the result of the video recognition processing from an additional-information delivering apparatus connected to the communications network; and a step of setting the predetermined parameter by performing calibration processing in cooperation with the video recognition apparatus.

The additional-information display system according to the present disclosure includes, a video receiving apparatus, a video recognition apparatus, and an additional-information delivering apparatus, which are each configured to be capable of transmitting and receiving data to and from each other via a communications network. The video receiving apparatus includes an input unit, a video extractor, a controller, and a calibration executor. The input unit is configured to be input with a video signal which is output from a video transmitting apparatus installed on the outside. The video extractor is configured to extract a partial video, which is to be used for video recognition processing, from the video signal. The controller is configured to control the following operations: That is, the controller transmits, to the video recognition apparatus via the communications network, either the partial video or content recognition information which is formed from the partial video, thereby requesting the video recognition apparatus to perform the video recognition processing. Then, the controller acquires a result of the video recognition processing from the video recognition apparatus via the communications network, and acquires additional information based on the result of the video recognition processing from the additional-information delivering apparatus via the communications network. The calibration executor performs calibration processing in cooperation with the video recognition apparatus, thereby setting the predetermined parameter. The video recognition apparatus is configured to perform the video recognition processing relating to the partial video received via the communications network, and transmit a result of the video recognition processing to the video receiving apparatus via the communications network. The video recognition apparatus is further configured to perform the calibration processing in cooperation with the video receiving apparatus to set the predetermined parameter, and transmit the resulting parameter to the video receiving apparatus. The additional-information delivering apparatus is configured to transmit, to the video receiving apparatus via the communications network, the additional information corresponding to the result of the video recognition processing that is received via the communications network.

BRIEF DESCRIPTION OF DRAWINGS

FIG. 4 is a schematic Table of an example of data on channels usable in the calibration processing, with the data being held in the video recognition apparatus, according to the first embodiment.

FIG. 12 is a schematic view, illustrated by using video images, of an example of calibration processing which is performed by an additional-information display system according to a second embodiment.

DESCRIPTION OF EMBODIMENTS

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art.

It is noted, however, that the accompanying drawings and the following descriptions are presented to facilitate fully understanding of the present disclosure by those skilled in the art, and are not intended to impose any limitations on the subject matter described in the appended claims.

First Exemplary Embodiment

Hereinafter, a first embodiment will be described with reference to FIGS. 1 to 11.

[1-1. Configuration]

[1-1-1. Outline of System Configuration]

Figure 1:
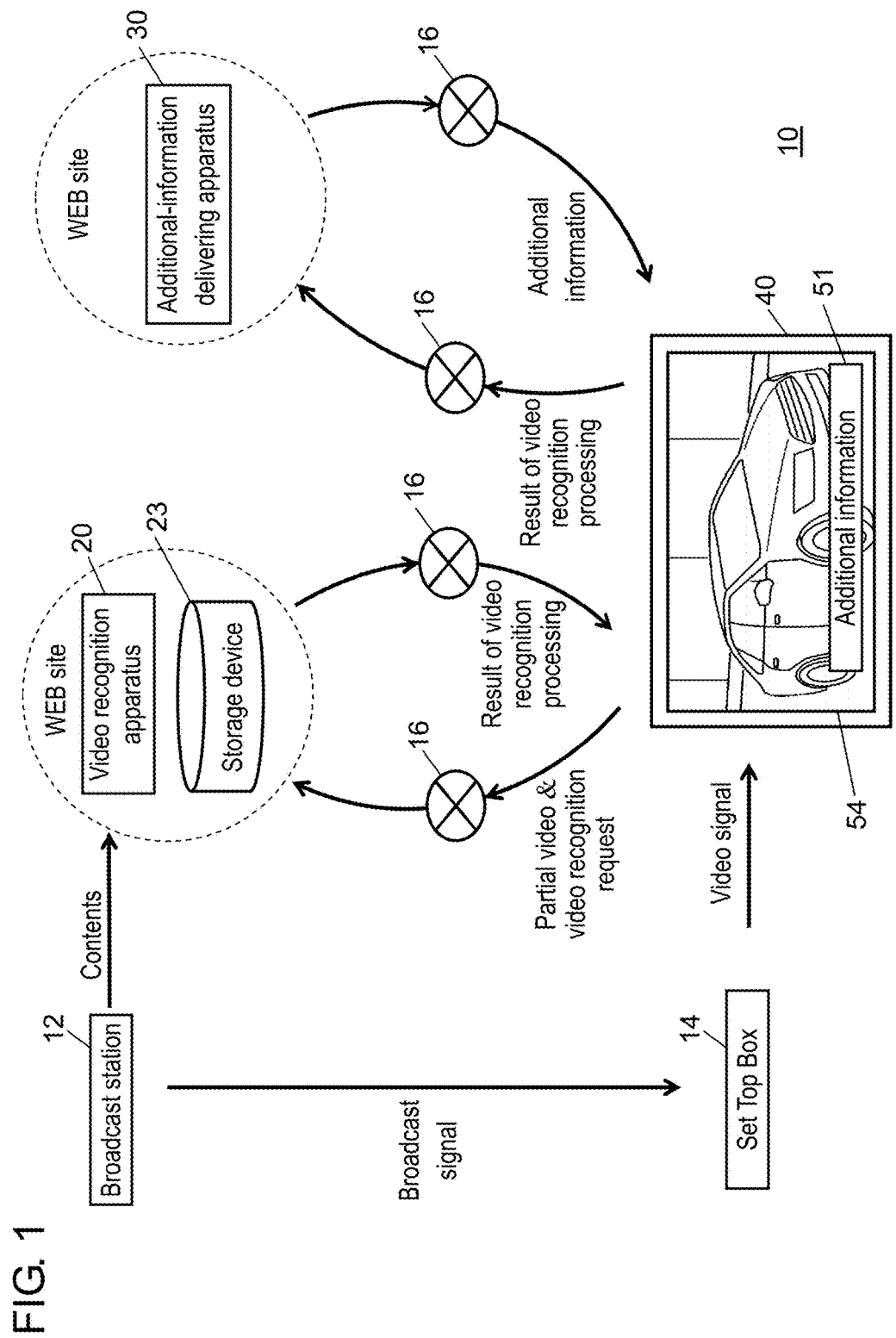
FIG. 1 is a schematic view of an example of a configuration of an additional-information display system according to a first embodiment.

FIG. 1 is a schematic view of an example of a configuration of additional-information display system 10 according to the first embodiment. Additional-information display system 10 includes broadcast station 12, Set Top Box (STB) 14 serving as a video transmitting apparatus, video recognition apparatus 20, additional-information delivering apparatus 30, and video receiving apparatus 40. Additional-information display system 10 is a communications system configured to be capable of specifying what content is contained in a video received by video receiving apparatus 40, by using a video recognition technology provided by video recognition apparatus 20. Moreover, the system is configured to be capable of acquiring additional information associated with the specified content from additional-information delivering apparatus 30, and of displaying the acquired additional information on video receiving apparatus 40.

Video receiving apparatus 40 is connected to each of video recognition apparatus 20 and additional-information delivering apparatus 30 via communications network 16.

Communications network 16 is configured with wired lines, wireless lines, or both mixed lines. Communications network 16 is the Internet, for example. The network, however, may be an intranet, a commercial communications line, another communications line, or mixed with them.

Video receiving apparatus 40 and STB 14 are connected to each other via a communication interface. The communication interface is High-Definition Multimedia Interface (HDMI) (Registered Trademark), for example. The interface, however, may also be a video cable or wireless communications including: Wi-Fi (Registered Trademark), Bluetooth (Registered Trademark), and a wireless Local Area Network (LAN).

Broadcast station 12 is a transmitting facility configured to transmit (broadcast) a broadcast signal. Broadcast station 12 generates a video signal of a television program containing both a program main content and a commercial message (CM), superimposes the video signal on a broadcast signal, and broadcasts the resulting signal. The program main content and the CM are alternately changed from one to another with time. Hereinafter, the program main content and the CM are referred simply to as "contents." That is, broadcast station 12 broadcasts the contents which are changed from one to another with the passage of time. It is noted, however, that the transmitting facility is not limited to broadcast station 12, and may be any facility that transmits or broadcasts the contents which are changed from one to another with the passage of time.

STB 14 is a receiver (tuner) configured to receive the broadcast signal broadcasted from broadcast station 12, and to detect the video signal from it. In cases where broadcast station 12 broadcasts a digital video signal, for example, STB 14 may be provided with a function of decoding the received video signal. STB 14 receives the broadcast signal on a channel which is selected from a plurality of channels broadcasted from broadcast station 12, in response to an instruction from a user. The STB outputs the received broadcast signal on the channel to video receiving apparatus 40 via a communication interface (e.g. HDMI [Registered Trademark]). Note that the video transmitting apparatus is not limited to STB 14, and may be a video recorder and the like which has functions of recording videos, receiving broadcast signals, and outputting video signals, for example.

Video receiving apparatus 40 is a video receiving device, e.g. a television receiver, which is configured to display, on display device 54, a video based on the video signal that is fed from the outside. Video receiving apparatus 40 is connected to communications network 16, thereby transmitting and receiving data to and from both video recognition apparatus 20 and additional-information delivering apparatus 30, via communications network 16.

Video receiving apparatus 40 according to the embodiment is configured to be able to perform the followings: That is, video receiving apparatus 40 performs video recognition processing relating to the video signal through use of video recognition apparatus 20, with the video signal being fed from the video transmitting apparatus (e.g. STB 14) via the communication interface. The video receiving apparatus specifies the contents expressed by the video signal. Then, the video receiving apparatus acquires additional information (e.g. advertisement information) associated with the contents, superimposes the acquired additional information on the video signal, and displays the result on display device 54.

Specifically, video receiving apparatus 40 performs cyclical extractions of partial videos by cyclically cutting parts from the video signal being fed. The video receiving apparatus transmits, to video recognition apparatus 20, both the partial videos and a request for the video recognition processing (also referred to as "video recognition request," hereinafter) via communications network 16. Then, the video receiving apparatus acquires the result of the video recognition processing relating to the partial videos, from video recognition apparatus 20 via communications network 16. The video receiving apparatus acquires additional information associated with the acquired result of the video recognition processing, from additional-information delivering apparatus 30 via communications network 16. Then, the video receiving apparatus displays, on display device 54, an image ("additional information 51" shown in FIG. 1) based on the acquired additional information, with the image being superimposed on the video that is currently being displayed. Details of these operations will be described later.

Note that, in the embodiment, the description is made using the case where the additional information is "the advertisement information associated with the contents." However, the additional information is not limited to this, and may be information including, for example, tourism information, history information, personality profile information, a Uniform Resource Locator (URL), official bulletin information, on-air program information, social information such as Twitter (Registered Trademark).

Video recognition apparatus 20 is a server connected to communications network 16, and serves as a Web Site to perform content specifying processing based on the video recognition processing. The content specifying processing includes the steps of performing the video recognition processing relating to the received partial video, and specifying the content expressed by the partial video based on the result of the video recognition processing. To perform the content specifying processing, video recognition apparatus 20 analyzes the contents that are broadcasted from broadcast station 12, and performs the video recognition processing based on the result of the analysis.

Video recognition apparatus 20 acquires substantially all of the contents that are broadcasted from broadcast station 12. Then, the video recognition apparatus analyzes the acquired contents in terms of: broadcasting time of each content, capacity, broadcast format, subject, genre, character, program guide, and the like. Then, the video recognition apparatus forms analysis information. Moreover, video recognition apparatus 20 forms a fingerprint from the video signal of the content that is acquired from broadcast station 12. The fingerprint is information for use in recognizing the video, which may be a hash value, for example, of each image that configures a moving image. Video recognition apparatus 20 may acquire the contents by receiving either the broadcast signal broadcasted from broadcast station 12 or the broadcast signal transmitted from the broadcast station via a leased video-communications line and the like. Moreover, the analysis may be either automatically performed or manually performed by an operator, for example. Both the fingerprint and the analysis information are stored in storage device 23 of video recognition apparatus 20, for every video of the contents (for example, for every video signal configuring a plurality of frames).

Upon receiving the video recognition request, which is accompanied by the partial video, transmitted from video receiving apparatus 40 via communications network 16, video recognition apparatus 20 performs the video recognition processing relating to the partial video in such a manner that: The fingerprint formed from the partial video is collated with fingerprints which have been formed, in advance, by video recognition apparatus 20 and stored in storage device 23. Then, based on the result of the collation, the content of the partial video is specified. In this way, video recognition apparatus 20 performs the content specifying processing by determining what content is expressed by the partial video transmitted from video receiving apparatus 40, thereby specifying the content based on the result of the determination. Then, the video recognition apparatus reads, from storage device 23, a result (analysis information) of the analysis of the specified content, and returns the thus-read analysis information, as the result of the video recognition processing, to video receiving apparatus 40 via communications network 16.

The video recognition processing including such a procedure (the content specifying processing based on video recognition processing) is also referred to as "Automatic Content Recognition (ACR)."

Additional-information delivering apparatus 30 is a server connected to communications network 16, which serves as a Web Site (an advertisement delivery site) to hold and deliver advertisement information of a wide range of products. Upon receiving the result of the video recognition processing transmitted from video receiving apparatus 40 via communications network 16 (where the result is the analysis information based on the result of the video recognition processing which video receiving apparatus 40 acquires from video recognition apparatus 20), additional-information delivering apparatus 30 transmits the additional information associated with the result (analysis information) of the video recognition processing, to video receiving apparatus 40 via communications network 16. The additional information is, for example, advertisement information associated with the content that has been specified through the video recognition processing.

[1-1-2. Configurations of Video Recognition Apparatus and Video Receiving Apparatus]

Figure 2:
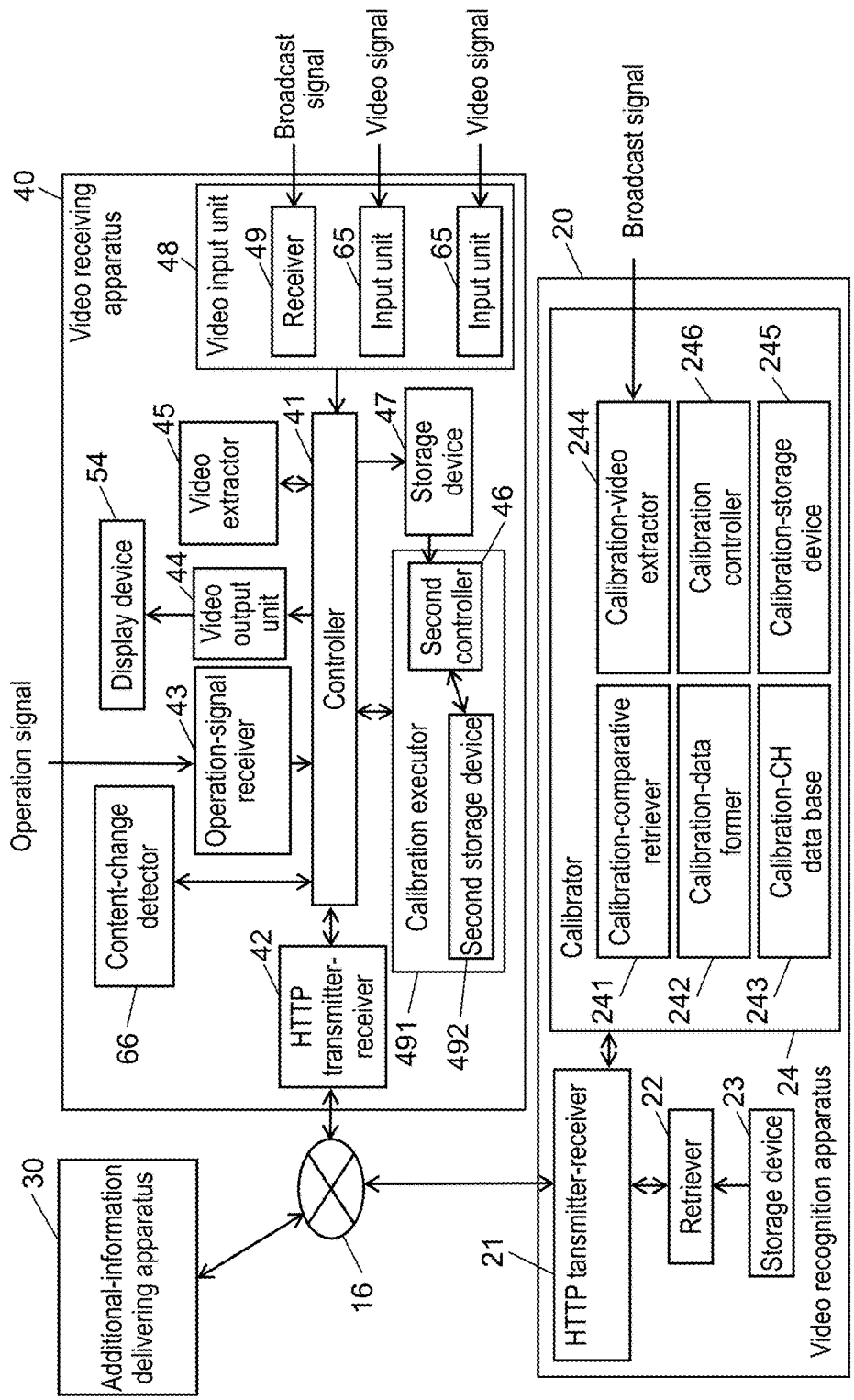
FIG. 2 is a schematic block diagram of an example of configurations of a video recognition apparatus and a video receiving apparatus according to the first embodiment.

FIG. 2 is a schematic block diagram of an example of configurations of video recognition apparatus 20 and video receiving apparatus 40 according to the first embodiment.

Note that, in FIG. 2, only major circuit blocks are shown relating to the operations to be described in the embodiment, and other circuit blocks and functions relating to other operations are omitted for easy understanding of the operations described in the embodiment. Moreover, the circuit blocks shown in FIG. 2 may be each configured with an independent circuit, or alternatively configured by executing, with a processor, a program which is intended to implement one or a plurality of functions of the circuit blocks shown in FIG. 2. Video recognition apparatus 20 is a server equipped with hypertext transfer protocol (HTTP) transmitter-receiver 21, retriever 22, storage device 23, and calibrator 24. Video recognition apparatus 20 is configured to provide video receiving apparatus 40 with a service of the content specifying processing based on the video recognition processing, via communications network 16.

HTTP transmitter-receiver 21 is a communication interface, i.e. a communication adapter compliant with a standard of Ethernet (Registered Trademark), IEEE 802.3 (Registered Trademark), or the like. HTTP transmitter-receiver 21 is configured to be capable of transmitting and receiving data to and from video receiving apparatus 40 via communications network 16.

Storage device 23 is a storage device configured with such as a Hard Disk Drive (HDD), for example. Storage device 23 is configured to store both the fingerprint of the content broadcasted from broadcast station 12 and the analysis information of the result of the analysis of the contents, with both the fingerprint and the analysis information being associated with the contents. The fingerprint is a hash value and the like, for example, of each image that configures a moving image.

Storage device 23 stores the fingerprint, intermediate data for forming the fingerprint, and the result of the analysis (analysis information), within a slight time delay (e.g. 10 seconds) after the broadcasting, for every one of the contents (e.g. program main contents or CMs) expressed by all of the channels (e.g. 300 channels) broadcasted from broadcast station 12. These thus-stored fingerprint, intermediate data, and result of the analysis are associated with the corresponding content. The result of the analysis (analysis information) may include a title of the program, a title of the CM, a synopsis of the program, a synopsis of the CM, characters, locations involved in the video, and URLs, for example.

Retriever 22 is configured such that, upon receiving the video recognition request accompanied by the partial video which is transmitted from video receiving apparatus 40 via HTTP transmitter-receiver 21, retriever 22 performs the content specifying processing based on the video recognition processing by using the partial video, and returns the result (analysis information) to video receiving apparatus 40 via HTTP transmitter-receiver 21. Note that, in the embodiment, the result of the content specifying processing based on the video recognition processing by using the partial video is also referred simply as "the result of the video recognition processing."

Specifically, retriever 22 receives the video recognition request accompanied by the partial video which is transmitted from video receiving apparatus 40 via communications network 16 and HTTP transmitter-receiver 21. Next, the retriever forms a finger print (e.g. a hash value of each image that configures the partial video) of the received partial video, and then collates the thus-formed fingerprint with the fingerprints stored in storage device 23, thereby retrieving the fingerprint corresponding to the received partial video (video recognition processing). Then, the retriever regards the content, which is specified based on the result of the retrieval so as to correspond to the fingerprint, as one corresponding to the received partial video (content specifying processing). In this way, retriever 22 specifies the content corresponding to the received partial video. Then, retriever 22 reads, from storage device 23, the result of the analysis (analysis information) associated with the specified content, and returns the thus-read result of the analysis, which is regarded as the result of the video recognition processing, to video receiving apparatus 40 via both HTTP transmitter-receiver 21 and communications network 16.

Calibrator 24 includes calibration-comparative retriever 241, calibration-data former 242, calibration-channel data base (referred to as "calibration-CH data base," hereinafter) 243, calibration-video extractor 244, calibration-storage device 245, and calibration controller 246. Calibrator 24 is configured to perform calibration processing while communicating with calibration executor 491 of video receiving apparatus 40 via HTTP transmitter-receiver 21. Note that the calibration processing as referred in the embodiment is the processing in which a parameter is set in order to either increase accuracy or reduce loads of the video recognition processing. The parameter is a set value that will be changed in accordance with a state of receiving the broadcast signal by video receiving apparatus 40 (STB 14). Details of this will be described later.

Calibration controller 246 performs various kinds of control, concerning the calibration processing, of each of the circuit blocks of calibrator 24.

Calibration-comparative retriever 241 is configured to perform the video recognition processing when the calibration processing is performed. This video recognition processing is substantially identical to the aforementioned video recognition processing that is performed for the content specifying processing. However, the video recognition processing performed by calibration-comparative retriever 241 is aimed at performing the calibration processing. Calibration-comparative retriever 241 is capable to change the parameter to be used in forming the fingerprint, thereby performing the video recognition processing.

Calibration-data former 242 is configured to form the fingerprint (fingerprint for calibration) that is used in performing the calibration processing. The thus-formed fingerprint is stored in calibration-storage device 245. Moreover, calibration-storage device 245 stores not only the fingerprint but also reception time (time at which video recognition apparatus 20 receives the broadcast signal on which the video signal is superimposed) of the video signal that serves as a base of the fingerprint. In the embodiment, the fingerprints and the reception times are stored in calibration-storage device 245 with the fingerprints and the reception times being respectively associated with each other, thereby configuring a data base for the calibration.

Calibration-CH data base 243 is the data base which contains information on the broadcast signal (the broadcast signal broadcasted from broadcast station 12), with the information being usable in performing the video recognition processing. The data base may be stored in a storage device separately-disposed and dedicated to the data base, or alternatively in calibration-storage device 245. Calibration controller 246 extracts, from the data base, a candidate of the channel to be used in performing the calibration processing, based on information transmitted from video receiving apparatus 40, and then transmits the extracted candidate to video receiving apparatus 40. Details of this will be described later.

Calibration-video extractor 244 is configured to extract the video signal for the calibration processing from the broadcast signal when the calibration processing is performed. Calibration-video extractor 244 is, for example, a tuner to receive the broadcast signal on the channel designated for the calibration, among the broadcast signals broadcasted from the broadcast station 12. It is noted, however, that calibration-video extractor 244 is not limited to the tuner, and may be configured to receive the broadcast signal transmitted from the broadcast station 12 via such as a communications line configured with an optical fiber and the like and to extract the video signal for the calibration, for example.

Calibration-storage device 245 is a storage device which is configured to store the result of the calibration processing. Calibration-comparative retriever 241 is configured to retrieve the data (a finger print, for example) for the calibration processing from calibration-storage device 245, when the video recognition processing is performed for the calibration.

Video receiving apparatus 40 includes controller 41, HTTP transmitter-receiver 42, operation-signal receiver 43, video output unit 44, display device 54, video extractor 45, storage device 47, content-change detector 66, calibration executor 491, and video input unit 48. Calibration executor 491 includes second controller 46 and second storage device 492. Video receiving apparatus 40 is configured to perform the followings: That is, the video receiving apparatus performs the content specifying processing based on the video recognition processing through use of video recognition apparatus 20. The video receiving apparatus acquires the analysis information, i.e. the result of the video recognition processing, from video recognition apparatus 20. The video receiving apparatus then acquires the additional information (e.g. advertisement information) associated with the analysis information, from additional-information delivering apparatus 30. The video receiving apparatus superimposes the image of the additional information (e.g. advertisement information associated with the video) on the video (contents) received by the video receiving apparatus. Then, the video receiving apparatus displays the resulting superimposed image on display device 54.

HTTP transmitter-receiver 42 is a communication interface, i.e. a communication adapter compliant with standards of Ethernet (Registered Trademark), IEEE 802.3 (Registered Trademark), or the like. HTTP transmitter-receiver 42 is configured to be capable of transmitting and receiving data to and from video recognition apparatus 20 via communications network 16.

Operation-signal receiver 43 is configured to receive an operation signal (an operation signal to operate video receiving apparatus 40) which is fed from an operation unit (not shown), a remote control unit (referred simply to as "remote controller," hereinafter) and the like which receives user's operations. Operation-signal receiver 43 may also be configured to receive a signal transmitted from the remote controller equipped with a gyro sensor which detects physical variations occurring in the remote controller, with the signal being generated in accordance with the detection.

Video input unit 48, being a receiver circuit and a decoder, includes: receiver 49 configured to receive the broadcast signal broadcasted from the broadcast station, and input unit 65 configured to be input with a video signal that is fed from a video transmitting apparatus (e.g. STB 14), a video recording-reproducing apparatus, or the like. The video signal received by video input unit 48 contains the contents (a program main content, a CM, and the like) that are alternately changed from one to another with the passage of time.

Receiver 49 is configured to receive the broadcast signal transmitted from broadcast station 12 via an antenna (not shown) and the like. Receiver 49 receives the broadcast signal on the channel designated based on the operation signal that is received by operation-signal receiver 43, for example.

Input unit 65 is an interface which is configured to be input with the video signal that is output from the video transmitting apparatus installed on the outside. Input unit 65 is configured to be compliant with the HDMI (Registered Trademark) standard, for example, so that it can receive the video signal transmitted via the HDMI (Registered Trademark). The video transmitting apparatus is STB 14, for example; however, it may be a video recording-reproducing apparatus and the like. Moreover the input unit may also be configured to be input with a video signal transmitted via a video cable, a video signal transmitted via wireless communications, or the like. It is noted that, in the embodiment, the video signal output from STB 14 is inputted to input unit 65.

Video output unit 44 has a function of controlling display device 54. With this function, it performs the control of display device 54 in accordance with the video signal inputted from video input unit 48 such that display device 54 displays a video based on the video signal. When the additional information is inputted from controller 41, video output unit 44 superimposes an image in accordance with the additional information on the video currently being displayed.

Display device 54 is a display device, such as a Liquid Crystal Display (LCD), for example, which is configured to display the video based on the video signal. However, the embodiment is not limited to this configuration; display device 54 may be a Plasma Display Panel (PDP), an Organic Electro-Luminescence Display (OLED), or the like.

Second controller 46 is configured to determine a cycle of the video recognition processing, a timing to start the video recognition processing, and the like when the video recognition processing relating to the video signal acquired by video input unit 48 is performed.

For example, second controller 46 is configured to provide video extractor 45 with an instruction which involves the timing and extraction cycle of the partial video, a size of the partial video to be extracted, and the like. Then, second controller 46 acquires the partial video, which is extracted in response to the instruction, from video extractor 45 when the calibration processing is performed.

Video extractor 45 is configured to extract the partial video from the video signal that is inputted from video input unit 48. Video extractor 45 is configured to extract the partial video lasting for a predetermined time from the video signal, with the partial video being a part of the video signal. This extraction is performed at the predetermined cycle or at the timing and cycle instructed by second controller 46. For example, assuming that either the predetermined cycle or the cycle instructed by second controller 46 is 3 seconds and that the predetermined lasting time of the partial video is 3 seconds, then video extractor 45 repeats, every 3 seconds, the operation of extracting the partial video lasting for 3 seconds from the video signal. That is, the video extractor repeats the extraction of the 3-minutes-lasting partial video from the video signal, every 3 seconds, continuously without interruption. For another example, assuming that either the predetermined cycle or the cycle instructed by second controller 46 is 15 seconds and that the predetermined lasting time of the partial video is 3 seconds, then video extractor 45 repeats, every 15 seconds, the operation of extracting the partial video lasting for 3 seconds from the video signal. That is, the video extractor repeats the operation of extracting the 3-minutes-lasting partial video from the video signal, at pause intervals of 12 seconds. It is noted, however, that the extraction of the partial videos from the video signal is not limited to this performed on a unit-of-second basis. Instead, the extraction of the partial videos may be performed on a number-of-frame basis. This number-of-frame is the number of the frames of the video; the number is either predetermined at a video frame rate or instructed by second controller 46.

Storage device 47 is a storage device which is configured with a nonvolatile memory and the like, for example. Storage device 47 stores the information including: program meta-information such as an electronic program guide (EPG) received by video input unit 48; and the additional information and the display control information of the additional information which are both acquired from additional-information delivering apparatus 30 via HTTP transmitter-receiver 42. The display control information of the additional information is used to control the display of the additional information. For example, it includes information on a display duration of the additional information.

Controller 41 is configured to control each of the circuit blocks included in video receiving apparatus 40. Controller 41 is configured including, for example, a nonvolatile memory such as ROM to store programs (e.g. application programs), a CPU to execute the programs, and another nonvolatile memory such as RAM to temporarily store data, parameters, and the like in cases where the CPU executes the programs.

Among the controls performed by controller 41 are the followings, for example: Controller 41 controls video extractor 45 such that extractor 45 extracts the partial video from the video signal at the predetermined cycle. The controller controls each of the circuit blocks such that, for every extraction of the partial video, video extractor 45 transmits the extracted partial video together with the request for the video recognition, to video recognition apparatus 20 via communications network 16, thereby requesting video recognition apparatus 20 to perform the video recognition processing (the content specifying processing based on the video recognition processing) of the extracted partial video. Then, the controller further controls each of the circuit blocks such that the result of the video recognition processing relating to the extracted partial video is acquired from video recognition apparatus 20 via both communications network 16 and HTTP transmitter-receiver 42. At that time, controller 41 may operates based on the result of the detection performed by content-change detector 66. That is, the controller may transmit the extracted partial video to video recognition apparatus 20 only when the extracted partial video does not contain any change in the contents, and may acquire the result of the video recognition processing relating to the extracted partial video from video recognition apparatus 20. Then, the controller yet controls each of the circuit blocks such that the additional information based on the result of the video recognition processing is acquired from additional-information delivering apparatus 30 via both communications network 16 and HTTP transmitter-receiver 42. Then, the controller still controls each of the circuit blocks such that the thus-acquired additional information is stored in storage device 47 and is output to video output unit 44, and such that the additional information is superimposed on the video currently being displayed on display device 54 so as to be displayed on the unit. At that time, when controller 41 determines that "the additional information is to be hidden" based on the display control information of the additional information, the controller controls each of the circuit blocks such that the additional information currently being displayed on display device 54 is made hidden.

In this way, controller 41 is configured to perform the video recognition processing (the content specifying processing based on the video recognition processing) in accordance with the partial video extracted by video extractor 45, through use of video recognition apparatus 20. Moreover, the controller is configured to perform the display control of the additional information that is acquired from additional-information delivering apparatus 30, with the additional information being based on the result of the video recognition processing acquired from video recognition apparatus 20. Such display control is performed in the following manner: That is, the controller determines either whether or not to display the acquired additional information on display device 54 (whether or not to superimpose it on the video signal) or whether to continuously display the additional information currently being displayed on display device 54 or to hide the additional information, based on the display control information and the like of the additional information. Then, the controller outputs an instruction based on the result of the determination to video output unit 44 and the like, thereby performing the display control.

Note that controller 41 may be configured to form content recognition information (e.g. the fingerprint) from the partial video extracted by video extractor 45, and to transmit the thus-formed content recognition information to video recognition apparatus 20, thereby requesting video recognition apparatus 20 to perform content recognizing processing based on the video recognition processing.

Note that additional-information display system 10 may be configured to operate as follows: That is, when video receiving apparatus 40 requests video recognition apparatus 20 to perform the video recognition processing, video receiving apparatus 40 forms a signal (data) indicating the request for the video recognition processing and transmits the signal, as the request for the video recognition, to video recognition apparatus 20. Or alternatively, instead of the transmission of such a signal (data), a procedure performed between video receiving apparatus 40 and video recognition apparatus 20 is adopted in advance, in which the transmission per se of the partial video from receiving apparatus 40 to video recognition apparatus 20 is automatically regarded as the request for video recognition apparatus 20 to perform the video recognition processing relating to the partial video, for example.

Content-change detector 66 is configured to detect a point of changing the contents, i.e. a point where the contents are changed from a program main content to a CM or vice versa, based on the video signal or the audio signal, and then to output the result of the detection to controller 41. For example, content-change detector 66 detects a point where the audio signal is changed from stereophonic one to monophonic one or vice versa, and then outputs the result of the detection to controller 41. Or alternatively, when the signal broadcasted from broadcast station 12 contains a signal indicating the point of changing the contents, the content-change detector detects the point of changing the contents based on such a signal, and then outputs the point to controller 41.

Calibration executor 491 performs the calibration processing for either increasing accuracy or reducing loads of the video recognition processing. Calibration executor 491 performs the calibration processing so as to set a parameter when video receiving apparatus 40 is initialized, for example. The thus-set parameter is used when the content specifying processing is performed later, for either increasing accuracy or reducing loads of the video recognition processing.

Note that, however, the calibration processing is not limited to this; instead, the calibration processing is performed when video receiving apparatus 40 is initialized. For example, the calibration processing may be performed periodically at a predetermined cycle, or alternatively performed in response to a user's optional instruction.

Second storage device 492 is a storage device which is configured with a nonvolatile memory and the like, for example, and stores the result (parameter) of the calibration processing. The result, stored in second storage device 492, of the calibration processing is used by second controller 46. Moreover, the result of the calibration processing is also stored in calibration-storage device 245 of video recognition apparatus 20.

Additional-information display system 10 according to the embodiment is configured as described above and has the following features:

(1) Video receiving apparatus 40 includes calibration executor 491, thereby performing the calibration processing for either increasing accuracy or reducing loads of the video recognition processing, and performing the initial setting of the parameter.

(2) Video recognition apparatus 20 includes calibrator 24, thereby performing the video recognition processing for the calibration processing (the initial setting of parameter).

(3) Video receiving apparatus 40 and video recognition apparatus 20 perform the aforementioned processing in cooperation with each other.

[1-2. Operation]

Operations of video receiving apparatus 40 and video recognition apparatus 20, both configured as described above, will be described with reference to FIGS. 3 to 10.

As described above, upon inputted with a video signal from the video transmitting apparatus such as STB 14, for example, video receiving apparatus 40 performs the video recognition processing relating to the video signal through use of video recognition apparatus 20. Then, the video receiving apparatus acquires, from additional-information delivering apparatus 30, additional information 51 (e.g. advertisement information) associated with the result of the video recognition processing, and superimposes the acquired additional information on the video signal, thereby displaying it on display device 54.

Video receiving apparatus 40 either displays or hides thus-acquired additional information 51 (e.g. advertisement information) depending on the display duration of the advertisement which is contained in advertisement-display control information acquired together with additional information 51. The advertisement-display control information is a kind of the display control information of the additional information described above.

Then, video receiving apparatus 40 and video recognition apparatus 20 perform the calibration processing for either increasing accuracy or reducing loads of the video recognition processing, and perform the initialization of the parameter. Hereinafter, operation of the calibration processing will be described.

[1-2-1. Operation of Calibration Processing]

Figure 3:
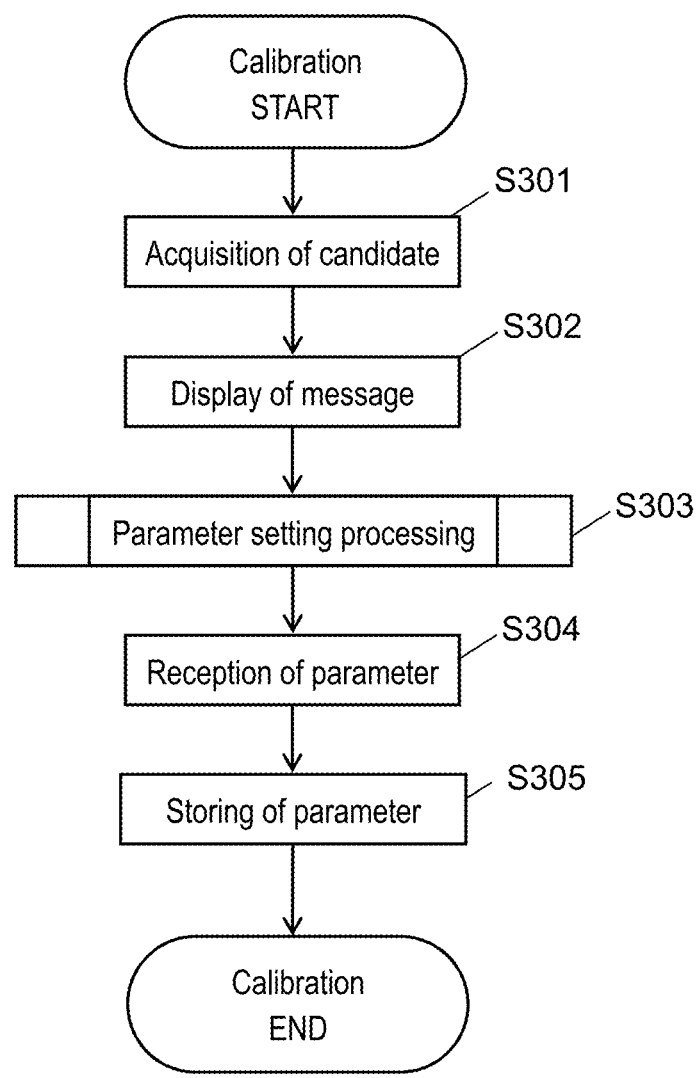
FIG. 3 is a schematic flowchart of an example of an operation of calibration processing of the video receiving apparatus according to the first embodiment.

FIG. 3 is a schematic flowchart of an example of the operation of the calibration processing of video receiving apparatus 40 according to the first embodiment.

First, second controller 46 of video receiving apparatus 40 instructs controller 41 to transmit information, to video recognition apparatus 20, which indicates a request to start the calibration. Upon receiving the information, calibrator 24 of video recognition apparatus 20 extracts, from calibration-CH data base 243, a candidate (channel candidate) of the channel which is usable (receivable by STB14) in the calibration processing performed by video receiving apparatus 40. Calibrator 24 of video recognition apparatus 20 transmits, to video receiving apparatus 40, information (data) indicating the thus-extracted channel candidate. The information (data) is received by second controller 46 of video receiving apparatus 40. That is, video receiving apparatus 40 acquires the channel candidate to be used in the calibration processing, from video recognition apparatus 20 (Step S301).

In Step 301, video receiving apparatus 40 acquires, from video recognition apparatus 20, the information (data) on the receivable channel (the channel usable in the calibration processing) which is can be received by video receiving apparatus 40. To that end, second controller 46 of video receiving apparatus 40 instructs controller 41 to transmit, to video recognition apparatus 20, information (regional information) on the region where video receiving apparatus 40 is installed, as well as the information indicating the request to start the calibration processing. The regional information is information (data) which can be used to identify the region where video receiving apparatus 40 (STB 14) is installed. Such information includes, for example, the IP address of video receiving apparatus 40 and the name of the region which is inputted by a user.

Note that the exchange of the data between video recognition apparatus and video receiving apparatus 40 is performed via HTTP transmitter-receivers 21, 42 and communications network 16; however, the description of this is omitted hereinafter.

Note that it is assumed that video receiving apparatus 40 and STB 14 are located at a substantially identical place; therefore, the regional information transmitted from video receiving apparatus 40 can indicate the place of installation of where STB 14.

Calibration-CH data base 243 included in video recognition apparatus 20 contains a plurality of kinds of the data concerning, such as, the contents and the channel usable in the calibration processing. Calibration controller 246 of video recognition apparatus 20 extracts a channel candidate usable in the calibration processing performed by video receiving apparatus 40, based on the information (regional information) transmitted from video receiving apparatus 40. Then, the calibration controller transmits the information (data) indicating the thus-extracted channel candidate to video receiving apparatus 40.

FIG. 4 is a schematic Table of an example of the data on the channels usable in the calibration processing, with the data being held in video recognition apparatus 20, according to the first embodiment.

In the calibration processing, use of the channel receivable by STB 14 is required. Accordingly, video recognition apparatus 20 includes calibration-CH data base 243 that contains a plurality of lists of the channels, as shown by an example in FIG. 4. From among the listed channels in calibration-CH data base 243, a channel receivable by STB 14 is selected as a channel candidate for the calibration, based on the information (the regional information capable of identifying the region where video receiving apparatus 40 is installed) transmitted from video receiving apparatus 40.

Note that, the channel for calibration is one or a plurality of the channels that are selected by video recognition apparatus 20, as the channel usable in the calibration processing, from among a plurality of channels broadcasted from broadcast station 12. Although, at present, broadcast station 12 does not broadcast a dedicated channel exclusively for calibration, broadcast station 12 may do this.

FIG. 4 shows such channel candidates usable in the calibration processing in Japan, as an example. As shown in FIG. 4, calibration-CH data base 243 of video recognition apparatus 20 stores data on the channels usable in the calibration processing, for each of the regions such as Tokyo, Osaka, and others, for example. Then, based on the information (regional information) transmitted from video receiving apparatus 40, a channel candidate is extracted from among the channels and is transmitted to video receiving apparatus 40. For example, when video recognition apparatus 20 determines that the region of installation of video receiving apparatus 40 (STB 14) is Tokyo based on the regional information transmitted from video receiving apparatus 40, the video recognition apparatus selects a channel receivable in Tokyo, and transmits the information (data) on the selected channel to video receiving apparatus 40.

Next, upon receiving the information (data) transmitted from video recognition apparatus 20, calibration executor 491 of video receiving apparatus 40 displays the information of the channel, which is contained in the data, on display device 54. Also, the calibration executor instructs controller 41 to display a message on display device 54, with the message prompting a user to change the STB 14's currently-receiving channel to the channel (channel for the calibration) in order to perform the calibration processing. After the STB 14's currently-receiving channel is changed to the channel (channel for the calibration) usable in the calibration processing, when a user's operation indicating the completion of changing the channel is performed, and yet when a user's operation indicating which channel the user selects is performed, operation-signal receiver 43 of video receiving apparatus 40 accepts these user's operations. Then, second controller 46 of video receiving apparatus 40 instructs controller 41 to transmit, to video recognition apparatus 20, both a signal indicating the completion of the changing to the channel for the calibration and a signal indicating which channel is selected (Step S302).

Figure 5:
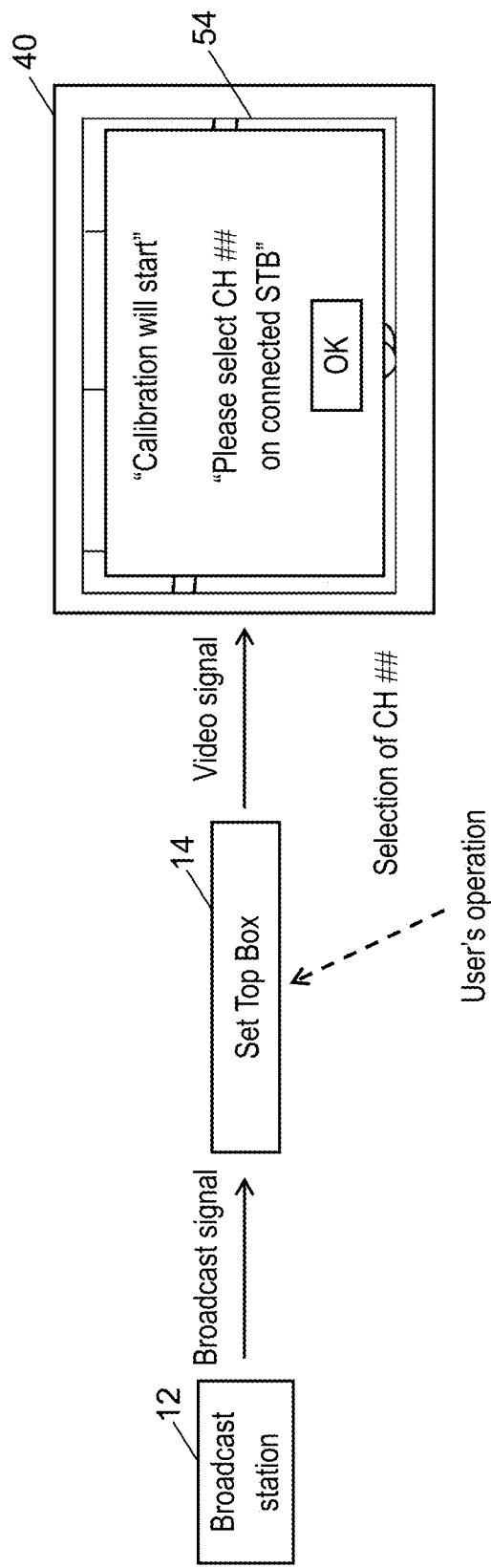
FIG. 5 is a schematic view of an example of a message which is displayed on a display device of the video receiving apparatus according to the first embodiment.

FIG. 5 is a schematic view of an example of the message which is displayed on display device 54 of video receiving apparatus 40 according to the first embodiment.

In Step S302, as shown by an example in FIG. 5, the message is displayed on display device 54, with the message prompting the user to change the STB 14's currently-receiving channel to the channel for the calibration in order to perform the calibration processing. In the example shown in FIG. 5, the message is displayed on display device 54, saying that "Calibration will start" and "Please select CH (channel) ## on connected STB". This "CH ##" is the channel for the calibration.

The message is preferably displayed together with another message which prompts the user to perform the user's operation that indicates the completion of changing the channel when the user finishes changing the channel.

Note that, the user's operation indicating the change of the channel is performed in STB 14, whereas the user's operation indicating the completion of changing the channel is performed in video receiving apparatus 40. This is because it is difficult for video receiving apparatus 40 to grasp the user's operation performed in STB 14.

Note that, FIG. 5 shows the case where one channel candidate is displayed on display device 54. However, it may be configured that a plurality of channel candidates are displayed, so that the user can select any one from the channel candidates. In such a case, the message is also preferably disposed together with another message which prompts the user to perform the user's operation indicating which channel the user has selected. This user's operation indicating which channel is selected is also performed in video receiving apparatus 40.

Note that it may be configured that, when the information on the plurality of the channel candidates is transmitted from video recognition apparatus 20 to video receiving apparatus 40, one of the channel candidates is optionally selected by video receiving apparatus 40. Then, only the selected channel is displayed on display device 54, and the information that indicates the channel selected by video receiving apparatus 40 is transmitted from video receiving apparatus 40 to video recognition apparatus 20.

Then, when the changing to the channel (channel for calibration) usable in the calibration processing is performed in STB 14, and yet when the user's operation indicating the completion of changing the channel is performed, calibration executor 491 of video receiving apparatus 40 instructs controller 41 to transmit, to video recognition apparatus 20, the signal indicating the completion of changing the channel to the channel for the calibration (together with the signal indicating which channel is selected).

Next, video receiving apparatus 40 starts the parameter setting processing in cooperation with video recognition apparatus 20 (Step S303). Details of Step S303 will be described later.

Note that the channel selected by the user's operation in Step S302 is "the channel designated for the calibration" described above. Calibration-video extractor 244 of video recognition apparatus 20 receives the broadcast signal on this channel among the broadcast signals broadcasted from broadcast station 12, and extracts the video signal for the calibration processing.

Next, the result of the parameter setting processing performed in Step S303, i.e. the information indicating the parameter determined through the calibration processing, is transmitted from video recognition apparatus 20 to video receiving apparatus 40.

Second controller 46 of video receiving apparatus 40 receives the information indicating the parameter (Step S304).

The parameter is used to set a region of the collation (or a start point of the collation) of the fingerprints stored in storage device 23 of video recognition apparatus 20, when video recognition apparatus 20 performs the video recognition processing relating to the partial video that is transmitted from video receiving apparatus 40 to video recognition apparatus 20. Details of the parameter will be described later.

Then, the parameter is stored and held in second storage device 492 of video receiving apparatus 40 (Step S305). The parameter stored in second storage device 492 is continuously used in the video recognition processing to be consecutively performed.

Next, the calibration processing according to the embodiment will be described.

Figure 6:
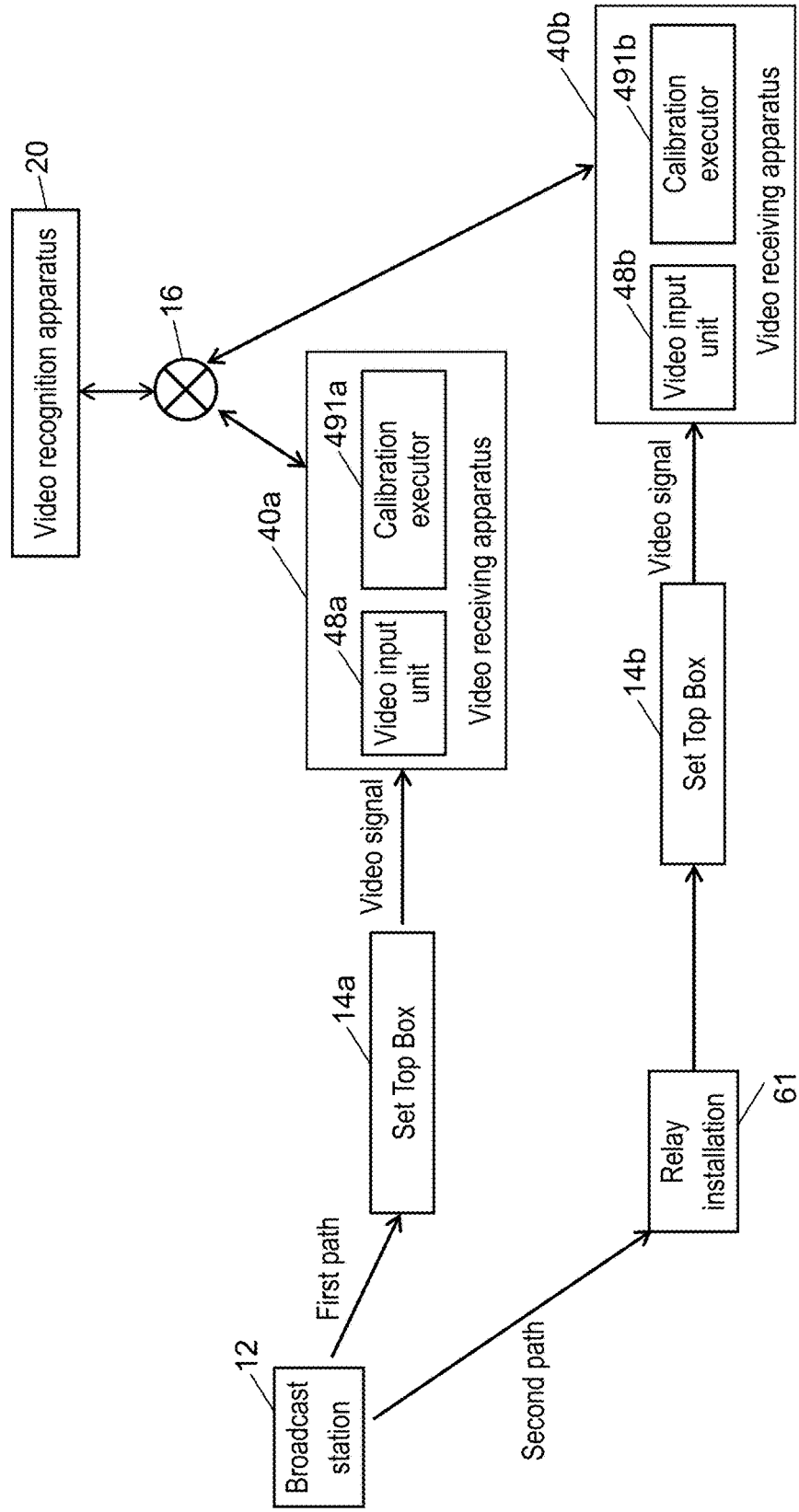
FIG. 6 is a schematic view of an example of paths through which a broadcast signal broadcasted from a broadcast station passes until the signal is displayed on the video receiving apparatus.

FIG. 6 is a schematic view of an example of paths through which the broadcast signal broadcasted from broadcast station 12 passes until the signal is displayed on video receiving apparatus 40.

In the example shown in FIG. 6, a first path is configured such that the broadcast signal broadcasted from broadcast station 12 is received by STB 14a without via relay installation 61, and that the video signal contained in the broadcast signal is inputted from STB 14a to video receiving apparatus 40a. On the other hand, a second path is configured such that the broadcast signal broadcasted from broadcast station 12 is received by STB 14b via relay installation 61, and that the video signal contained in the broadcast signal is inputted from STB 14b to video receiving apparatus 40b. Note that each of video input units 48a and 48b shown in FIG. 6 has the substantially same configuration and operations as those of video input unit 48, while each of calibration executors 491a and 491b has the substantially same configuration and operations as those of calibration executor 491.

In this way, the broadcast signal broadcasted from broadcast station 12 is not always directly received by STB 14 and/or video receiving apparatus 40 in the same manner. There are some cases where the signal is directly received without via relay installation 61, and others where the signal is received via one or a plurality of relay installations 61 in the path. That is, the paths show diversity.

Then, such paths vary the timing at which the broadcast signal broadcasted from broadcast station 12 is received by STB 14 and/or video receiving apparatus 40.

Figure 7:
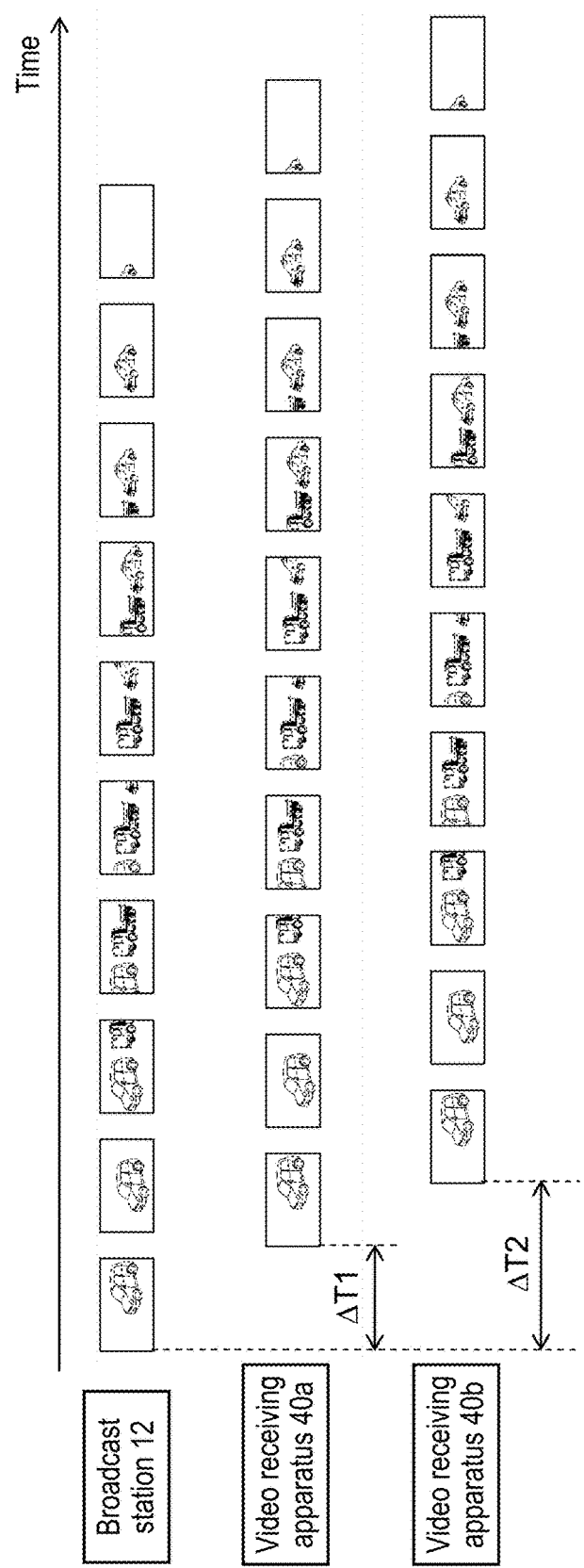
FIG. 7 is a schematic view of an example of time delays of the broadcast signal until the signal is received by STBs.

FIG. 7 is a schematic view of an example of time delays of the broadcast signal until the signal is received by STBs 14.

In FIG. 7, the horizontal axis represents a lapse of time. Then, videos are schematically shown there which include a video of the broadcast signal broadcasted from broadcast station 12, the video displayed on video receiving apparatus 40a, and the video displayed on video receiving apparatus 40b.

For example, FIG. 6 shows the following cases. With the first path in which the broadcast signal broadcasted from broadcast station 12 is received by STB 14a without via relay installation 61, there exists a time delay of $\Delta T1$ until the broadcast signal broadcasted from broadcast station 12 is displayed on video receiving apparatus 40a. On the other hand, with the second path in which the broadcast signal broadcasted from broadcast station 12 is received by STB 14b via relay installation 61, there exists a time delay of $\Delta T2$ until the broadcast signal broadcasted from broadcast station 12 is displayed on video receiving apparatus 40b, with $\Delta T2$ being larger than $\Delta T1$. This is because the second path causes an additional time delay due to the way passing through relay installation 61.

It is noted, however, that such time delays are sometimes different depending on the channel. Moreover, even on the same channel, the time delays are sometimes different between a time slot for a nationwide broadcast from a key station and a time slot for a local broadcast from a local station.

In this way, the time delay until the broadcast signal broadcasted from broadcast station 12 is displayed on video receiving apparatus 40 is sometimes different depending on the path from broadcast station 12 to STB 14. Then, such a difference in the time delay causes a difference in time at which video recognition apparatus 20 receives the partial video from video receiving apparatus 40. For example, the timing at which video recognition apparatus 20 receives the partial video is different between the partial video transmitted from video receiving apparatus 40a and the partial video from video receiving apparatus 40b. In this way, even for the same partial video, when the timing at which video recognition apparatus 20 receives the partial video is different in each of video receiving apparatuses 40, video recognition apparatus 20 needs to allow for the difference in the timing when performing the video recognition processing. That is, the partial video has to be collated with a wider region of the video data (fingerprints), resulting in increased loads of the video recognition processing.

In the embodiment, even if there exists a difference in the time delay until the broadcast signal broadcasted from broadcast station 12 is displayed on video receiving apparatus 40, depending on video receiving apparatus 40, the calibration is performed so that the loads of the video recognition processing is reduced.

Figure 8:
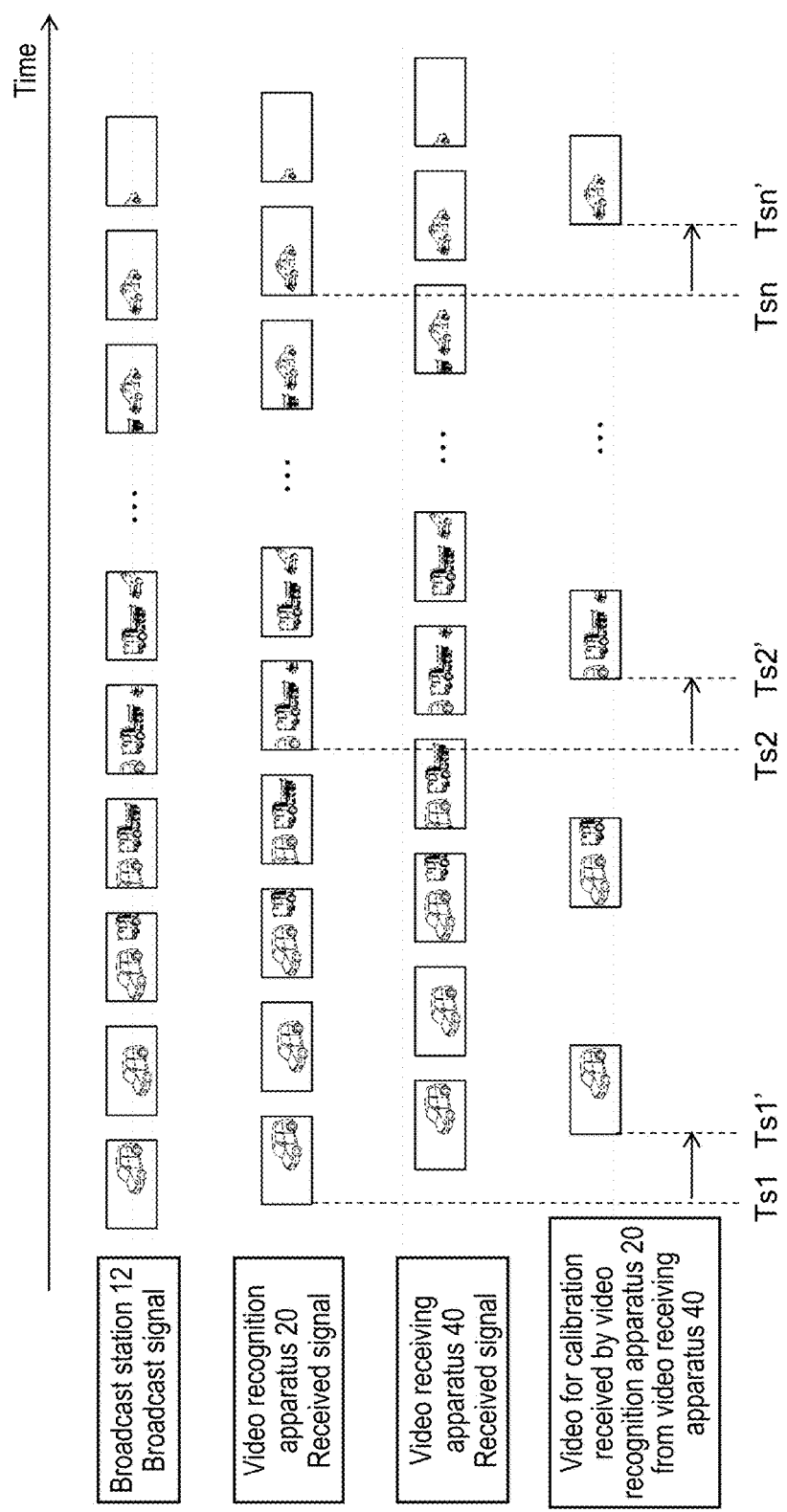
FIG. 8 is a schematic view illustrating, by using video images, an example of the calibration processing which is performed by the additional-information display system according to the first embodiment.

FIG. 8 is a schematic view illustrating, by using video images, an example of the calibration processing which is performed in additional-information display system 10 according to the first embodiment.

In FIG. 8, the horizontal axis represents a lapse of time. Then, videos are schematically shown there which include a video of the broadcast signal broadcasted from broadcast station 12, the video of the broadcast signal received by video recognition apparatus 20 from broadcast station 12, the video displayed on video receiving apparatus 40, and a partial video for calibration received by video recognition apparatus 20 from video receiving apparatus 40.

Figure 9:
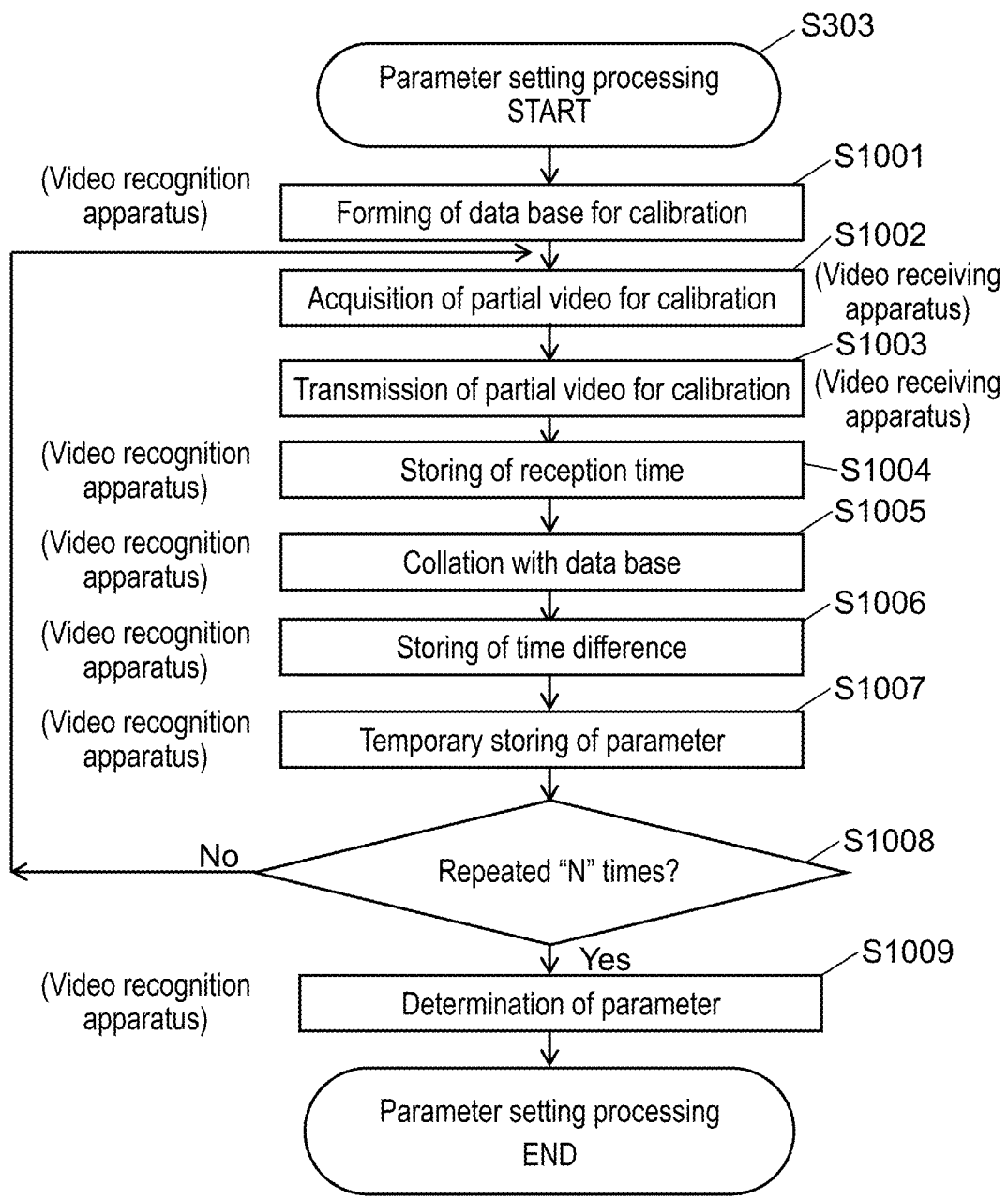
FIG. 9 is a schematic flowchart of an example of an operation of parameter setting processing which is performed by the additional-information display system according to the first embodiment.

FIG. 9 is a schematic flowchart of an example of an operation of the parameter setting processing which is performed in additional-information display system 10 according to the first embodiment. The flowchart shown in FIG. 9 illustrates details of the parameter setting processing in Step S303 shown in FIG. 3.

Hereinafter, a description of the flowchart shown in FIG. 9 will be made, together with a description of FIG. 8.

Calibration-data former 242 of video recognition apparatus 20 forms the fingerprint for use in the calibration processing, thereby forming the data base for the calibration (Step S1001).

In the example shown in FIG. 8, video recognition apparatus 20 receives the broadcast signal broadcasted from broadcast station 12, with a smaller time delay than video receiving apparatus 40. From the broadcast signal, calibration-data former 242 forms the fingerprint to be used in the calibration processing. The fingerprint formed in Step S1001 is stored in calibration-storage device 245. Moreover, the reception time of the video signal serving as a base of the fingerprint is stored in calibration-storage device 245, with the reception time being associated with the fingerprint. (Such reception time is the time at which video recognition apparatus 20 receives the broadcast signal on which the video signal concerned is superimposed.)

In this way, the fingerprint and the reception time are stored in calibration-storage device 245, with both being associated with each other, thereby configuring the data base for the calibration.

Note that, in FIG. 8, times Ts1, Ts2, . . . , Tsn are the reception times at which video recognition apparatus 20 receives broadcast signals from broadcast station 12. Each of such broadcast signals corresponds to the first one of the partial videos for the calibration which are transmitted from video receiving apparatus 40 to video recognition apparatus 20.

In response to the instruction from second controller 46, video extractor 45 of video receiving apparatus 40 acquires the partial video for the calibration from the video signal that is inputted to video receiving apparatus 40 from STB 14 (Step S1002).

Calibration executor 491 of video receiving apparatus 40 instructs controller 41 to transmit, to video recognition apparatus 20, the partial video for the calibration that is acquired in Step S1002 (Step S1003).

Video recognition apparatus 20 receives the partial video for the calibration that is transmitted from video receiving apparatus 40 in Step S1003. Then, reception time Ts1' of the partial video is stored in calibration-storage device 245 (Step S1004).

Note that, in FIG. 8, times Ts1', Ts2', . . . , Tsn' are the reception times (the reception times of the first videos of the partial videos) at which video recognition apparatus 20 receives the partial videos transmitted, as the videos for the calibration, from video receiving apparatus 40.

In FIG. 8, times Ts1', Ts2', . . . , Tsn' are later than times Ts1, Ts2, . . . , Tsn, respectively. These time differences are attributed to the transmission paths from broadcast station 12 to STB 14, as described above. Moreover, the time differences are also attributed to other factors including the time required for various kinds of processing performed in video receiving apparatus 40 and the time required for the transmission of the data from video receiving apparatus 40 to video recognition apparatus 20.

It is noted, however, that the time differences vary depending on the locations of installation of video recognition apparatus 20 and STB 14 (video receiving apparatus 40), the transmission paths of the broadcast signal, and the like.

Calibration-comparative retriever 241 video recognition apparatus 20 collates the fingerprint, which is formed from the partial video for the calibration transmitted from video receiving apparatus 40, with the data base for calibration stored in calibration-storage device 245 (Step S1005). Then, the retriever selects, from the data base, a fingerprint having the closest similarity to the thus-collated fingerprint, and regards the selected one as the fingerprint corresponding to the partial video transmitted from video receiving apparatus 40. In addition, the retriever also retrieves, from calibration-storage device 245, the reception time associated with the thus-selected fingerprint.

In this way, the retriever specifies the video that corresponds to the partial video for the calibration transmitted from video receiving apparatus 40, and determines reception time Ts1 of the broadcast signal on which the video is superimposed.

Calibration controller 246 calculates the time difference between time Ts1 and time Ts1' and stores the result in calibration-storage device 245 (Step S1006).

At that point in time, to provide for a sudden termination of the calibration, calibration controller 246 temporarily stores the calculation result in Step S1006, as a parameter, in calibration-storage device 245 (Step S1007). This is aimed at permitting the result in Step S1006 to be usable as the parameter.

The Steps from Step S1002 to Step S1007 are repeated N times (N is an integer not smaller than one) (Step S1008).

With this operation, times Ts2', Ts3', . . . , Tsn' are measured in Step S1004, and times Ts2, Ts3, . . . , Tsn are determined in Step S1005. Then, in Step S1006, the time differences are calculated which are the differences between times Ts2 and Ts2', between times Ts3 and Ts3', . . . , and between times Tsn and Tsn'. In this way, N time differences are calculated.

After the steps from Step S1002 to Step S1007 have been repeated N times, calibration controller 246 determines the final parameter based on the following N time differences calculated in Step S1006 and stored in calibration-storage device 245 (Step S1009). The N time differences are the differences between times Ts1 and Ts1', between times Ts2 and Ts2', . . . , and between times Tsn and Tsn+.

In this way, in the embodiment, the parameter determined in Step S1009 expresses the time difference between the time (e.g. times Ts1', Ts2', . . . , Tsn') at which video recognition apparatus 20 receives the partial video transmitted from video receiving apparatus 40 and the time (e.g. times Ts1, Ts2, . . . , Tsn) at which video recognition apparatus 20 receives the broadcast signal corresponding to the partial video.

Note that calibration controller 246 may take, in Step S1009, an arithmetic mean of the N time differences calculated in Step S1006, thereby calculating the final parameter; however, the embodiment is not limited to this calculation procedure. For example, calibration controller 246 may use the mode (the value that appears most often in a set of data) of the N time differences as the final parameter. Or alternatively, it may use the median value of the distribution of the N time differences as the final parameter. Moreover, other statistical procedures may be employed to determine the final parameter.

The parameter determined in Step S1009 is stored in calibration-storage device 245. Also, the parameter is transmitted from video recognition apparatus 20 to video receiving apparatus 40, and stored in second storage device 492 of video receiving apparatus 40.

This completes the parameter setting processing in Step S303.

When video receiving apparatus 40 requests video recognition apparatus 20 to perform the content specifying processing, the parameter stored in second storage device 492 is transmitted together with the partial video from video receiving apparatus 40 to video recognition apparatus 20. That is, controller 41 of video receiving apparatus 40 transmits the parameter stored in second storage device 492 together with the partial video to video recognition apparatus 20, thereby requesting video recognition apparatus 20 to perform the video recognition processing.

Video recognition apparatus 20 uses the parameter when collating the fingerprint formed from the partial video that is transmitted from video receiving apparatus 40 with the fingerprints stored in storage device 23. That is, based on the parameter, retriever 22 of video recognition apparatus 20 sets a region, in the data base, of the collation (or a start point of the collation) with the fingerprints stored in storage device 23. Based on the thus-set region of the collation (or the start point of the collation), the retriever performs the video recognition processing relating to the partial video that is received from video receiving apparatus 40.

If the video recognition processing was performed without using the parameter, video recognition apparatus 20 would need to allow for the difference in the time delays described above, in setting the region of collation for the video recognition processing. This results in a relatively large region of collation.

Fortunately, use of the parameter to set the region of collation for the video recognition processing allows a narrow region of collation relative to the case without use of the parameter. This results in reduced loads of the video recognition processing performed by video recognition apparatus 20. The reduced loads, in turn, allow increased accuracy of the video recognition processing.

[1-3. Effect and Others]

As described above, in the embodiment, video receiving apparatus 40 is configured to be capable of transmitting and receiving the data via communications network 16. This apparatus includes video input unit 48, video extractor 45, controller 41, and calibration executor 491. Video input unit 48 is configured to be input with the video signal output from a video transmitting apparatus (e.g. STB 14) installed on the outside. Video extractor 45 is configured to extract the partial video, which is to be used for the video recognition processing, from the video signal. Controller 41 is configured to control the following operations: Either the partial video or the content recognition information formed from the partial video is transmitted to video recognition apparatus 20 connected to communications network 16, thereby requesting the video recognition apparatus to perform the video recognition processing. Then, the result of the video recognition processing from video recognition apparatus 20 is acquired, and the additional information based on the result of the video recognition processing is acquired from additional-information delivering apparatus 30 connected to communications network 16. Calibration executor 491 is configured to perform the calibration processing in cooperation with video recognition apparatus 20 to set the predetermined parameter.

Video recognition apparatus 20 is configured to perform the calibration processing in cooperation with video receiving apparatus 40, to set the predetermined parameter, and to transmit the resulting parameter to video receiving apparatus 40.

The video signal inputted to video input unit 48 of video receiving apparatus 40 during the calibration is the video signal of the broadcast signal on the channel for the calibration. The broadcast signal received by video recognition apparatus 20 during the calibration is the broadcast signal on the channel for the calibration.

Calibration executor 491 of video receiving apparatus 40 may be configured to receive and store the parameter that is transmitted, as the result of the calibration processing, from video recognition apparatus 20.

Moreover, calibration executor 491 may be configured to transmit, to video recognition apparatus 20, the regional information usable for identifying the region in which video receiving apparatus 40 is installed, with the request to start the calibration processing. Then, the calibration executor may be configured to receive the information indicating the candidate of the channel for the calibration, with the information being transmitted from video recognition apparatus 20.

In this case, video recognition apparatus 20 may be configured to select candidates of the channel for calibration from calibration-CH data base 243 based on the regional information received from video receiving apparatus 40, and to transmit the selected candidates to video receiving apparatus 40.

Moreover, video receiving apparatus 40 may be configured further including display device 54 that is configured to display the video in which the additional information is superimposed on the video signal. Then, calibration executor 491 may be configured to display, on display device 54, both the channel candidates for calibration and a message which prompts the user to change the currently-receiving channel to any one of the channel candidates for calibration.

Moreover, video receiving apparatus 40 may include operation-signal receiver 43 that is configured to receive the user's operation which indicates the completion of changing the channel.

The parameter may be data indicating the time difference between the reception time, i.e. the time at which video recognition apparatus 20 receives the partial video transmitted from video receiving apparatus 40, and the acquisition time, i.e. the time at which the video recognition apparatus acquires the broadcast signal corresponding to the partial video. Moreover, controller 41 may be configured to transmit, to video recognition apparatus 20, the parameter together with either the partial video or the content recognition information, and to request the video recognition apparatus to perform the video recognition processing.

In this case, video recognition apparatus 20 may be configured to set a parameter indicating the time difference between the reception time, i.e. the time at which video recognition apparatus 20 receives the partial video transmitted from video receiving apparatus 40, and the acquisition time, i.e. the time at which video recognition apparatus 20 acquires the broadcast signal corresponding to the partial video. Then, the video recognition apparatus may be configured to transmit the thus-set parameter to video receiving apparatus 40.

With this configuration, video recognition apparatus 20 can narrow the region of collation for the video recognition processing relative to the case of performing the video recognition processing without using the parameter, thereby reducing the loads of the video recognition processing.

Second Exemplary Embodiment

The parameter that is set in the first embodiment is used to set the region of collation in the data base of the fingerprints, in performing the video recognition processing; however, the parameter that is set by the calibration processing is not limited this. In a second embodiment, a case will be described where other parameters are set by calibration processing.

Hereinafter, the second embodiment will be described with reference to FIGS. 10 to 14.

Note that, in the first embodiment, the configuration has been described in which the partial video is transmitted from video receiving apparatus 40 to video recognition apparatus 20 to perform the content specifying processing; however, the content specifying processing may be performed by transmitting the fingerprint from a video receiving apparatus to a video recognition apparatus. In the second embodiment, a configuration will be described in which video receiving apparatus 140 forms the fingerprint from the partial video. Then, the thus-formed fingerprint is transmitted from video receiving apparatus 140 to video recognition apparatus 120, thereby requesting the video recognition apparatus to perform the content specifying processing.

[2-1. Configuration]

Additional-information display system 110 according to the embodiment includes constituent elements of video recognition apparatus 120 and video receiving apparatus 140.

Figure 10:
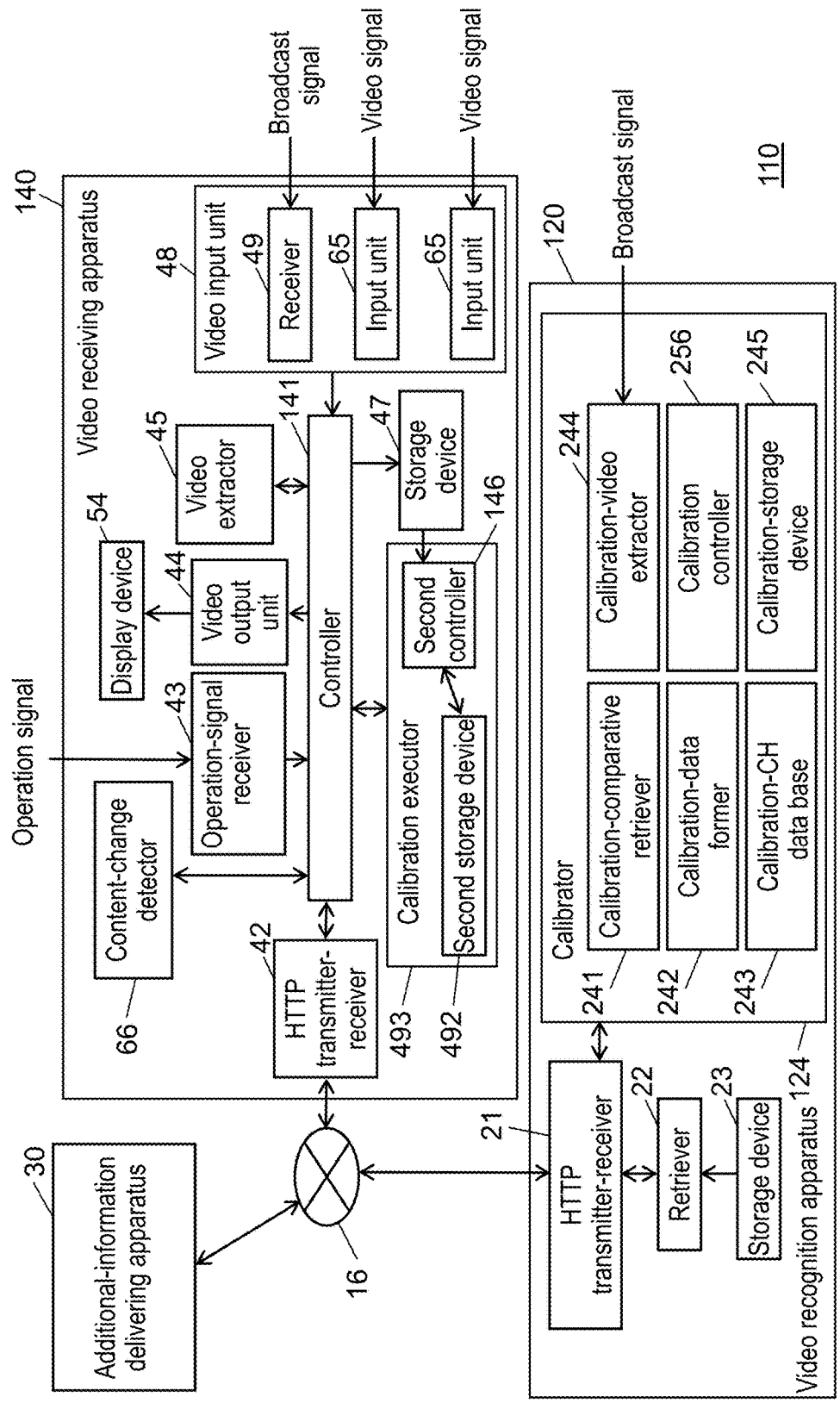
FIG. 10 is a schematic block diagram of an example of configurations of a video recognition apparatus and a video receiving apparatus according to a second embodiment.

FIG. 10 is a schematic block diagram of an example of configurations of video recognition apparatus 120 and video receiving apparatus 140 according to the second embodiment. Note that, in FIG. 10, only major circuit blocks relating to the operations to be described in the embodiment are shown, and other circuit blocks and functions relating to other operations are omitted. Note that, in the embodiment, constituent elements having substantially the same operations as those of video recognition apparatus 20 and video receiving apparatus 40 shown in FIG. 2 are designated by the same numerals and symbols, and their descriptions will be omitted.

Video recognition apparatus 120 includes HTTP transmitter-receiver 21, retriever 22, storage device 23, and calibrator 124.

Calibrator 124 includes calibration-comparative retriever 241, calibration-data former 242, calibration-CH data base 243, calibration-video extractor 244, calibration-storage device 245, and calibration controller 256. Calibrator 124 is configured to perform the calibration processing while communicating with calibration executor 493 included in video receiving apparatus 140.

Video recognition apparatus 120 has substantially the same configuration and substantially the same operation as those of video recognition apparatus 20 shown in the first embodiment. However, calibrator 124 performs parameter setting processing (regarding the parameter which is set in the parameter setting processing) different from the parameter setting processing performed by calibrator 24 described in the first embodiment. Details of this will be described later.

Video receiving apparatus 140 includes controller 141, HTTP transmitter-receiver 42, operation-signal receiver 43, video output unit 44, display device 54, video extractor 45, storage device 47, content-change detector 66, calibration executor 493, and video input unit 48. Calibration executor 493 includes second controller 146 and second storage device 492.

Video receiving apparatus 140 has substantially the same configuration and substantially the same operation as those of video receiving apparatus 40 shown in the first embodiment. However, there exist differences from the first embodiment in that controller 141 forms a fingerprint from the partial video and transmits the fingerprint to video recognition apparatus 120, thereby requesting the video recognition apparatus to perform the content specifying processing, and in that the calibration processing (in which the parameter is set in the parameter setting processing) performed by both second controller 146 and calibration executor 493 is different from that performed by both second controller 46 and calibration executor 491 described in the first embodiment. Details of this will be described later.

[2-2. Operation]

Hereinafter, an operation of the calibration processing according to the second embodiment will be described.

In the first embodiment, the description has shown that the difference in time (time delay) until the broadcast signal is received by STB 14 occurs for every STB 14, with reference to FIGS. 6 and 7. The occurrence of the difference depends on the path of the broadcast signal, that is, whether or not it passes by way of relay installation 61 between its transmission from broadcast station 12 and its reception by STB 14, or alternatively how many number of relay installations 61 in the path. Then, the description is made using the example in which the parameter is set by the calibration processing in order to prevent the loads of the video recognition processing performed by video recognition apparatus 20 from increasing due to the difference in the time delay.

However, the difference in the broadcast path of the broadcast signal is responsible for not only the occurrence of the time delay. Such a difference in the broadcast path possibly causes a change in the video signal of the broadcast signal received by STB 14. An example of the possibly-caused change in the video signal will be described, with reference to FIGS. 11A and 11B.

Figure 11A:
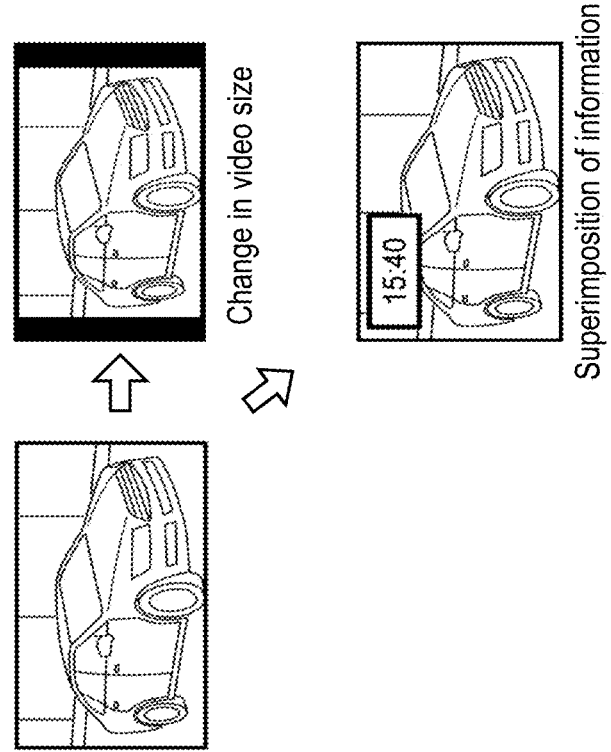
FIG. 11A is a schematic view of an example of changes appearing in a displayed video when the broadcast signal broadcasted from broadcast station 12 deteriorates in a period until the signal is received by STB 14.

FIG. 11A is a schematic view of the example of changes appearing in the displayed video when the broadcast signal broadcasted from broadcast station 12 deteriorates in the period until the broadcast signal is received by STB 14.

When the broadcast signal received by STB 14 deteriorates for some reasons, the displayed video may change in brightness and/or hues, and/or the displayed video may deteriorate in image quality into an unsharp one, as shown in FIG. 11A, for example.

Figure 11B:
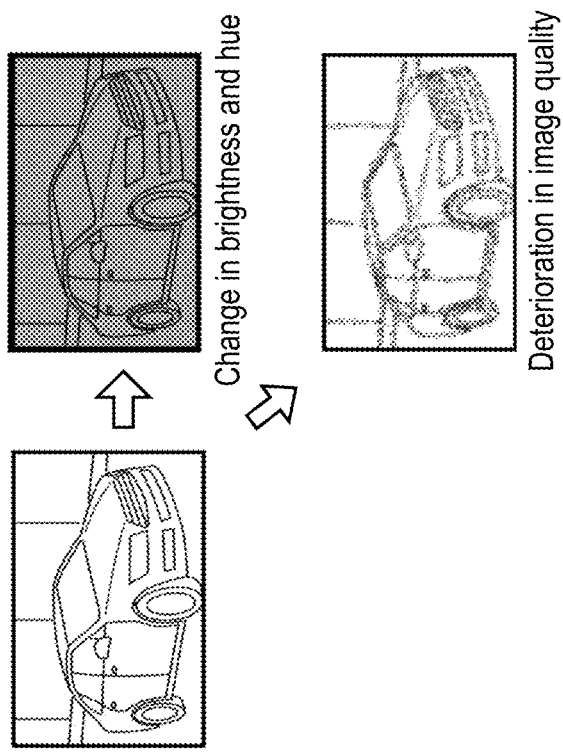
FIG. 11B is a schematic view of an example of the displayed video when the video signal contained in the broadcast signal broadcasted from broadcast station 12 is subjected to processing.

FIG. 11B is a schematic view of an example of the displayed video when the video signal in the broadcast signal broadcasted from broadcast station 12 is subjected to processing.

With some operational specifications of STB 14, STB 14 sometimes applies some processing to the video signal of the broadcast signal such that, for example, the size of the video is changed or new information absent in the original video is imposed on the video.

When the video displayed on display device 54 of video receiving apparatus 140 is changed from its original video broadcasted from broadcast station 12, the accuracy of the video recognition processing decreases in accordance with the degree of the change, with the video recognition processing being performed by video recognition apparatus 120 for the partial video cut from the thus-changed video. For example, there is a possibility that, when the change is relatively large as the example shown in FIGS. 11A and 11B, the accuracy of the video recognition processing decreases relatively greatly. Accordingly, in such a case, the accuracy of the video recognition processing is preferably enhanced by transmitting the partial videos as many as possible, from video receiving apparatus 140 to video recognition apparatus 120, to increase the number of times of the video recognition processing. Unfortunately, this possibly results in not only an increased amount of data communications (the amount of the data transmitted from video receiving apparatus 140 to video recognition apparatus 120), but also an increased load of the video recognition processing, a lengthened time period required for the video recognition processing, and the like.

In contrast, when the video displayed on display device 54 of video receiving apparatus 140 is less changed compared to its original video transmitted from broadcast station 12, the video recognition processing can be highly-accurately performed even if the transmission cycle of the partial videos from video receiving apparatus 140 to video recognition apparatus 120 is set to be relatively longer, and yet even if the number of times of the video recognition processing performed by video recognition apparatus 120 is relatively reduced.

Unfortunately, it is difficult for video receiving apparatus 140 to grasp the degree of the change in the video signal fed from STB 14 in comparison with its original video signal transmitted from the broadcast station.

If a large amount of information (the fingerprints formed from the partial videos) was always transmitted from video receiving apparatus 140 to video recognition apparatus 120, keeping the accuracy of the video recognition processing would be possible even in a case where the degree of the change in the video is not clear. Unfortunately, such an operation performed by video receiving apparatus 140 causes undesirable results, that is, an increased amount of the data transmitted from video receiving apparatus 140 to video recognition apparatus 120 and an increased load on video recognition apparatus 120.

In the embodiment, to address such a situation, a parameter is set by the calibration processing.

It is noted that the procedure of the calibration processing performed in the second embodiment is substantially the same as that of the flowchart shown in FIG. 3 in the first embodiment except for the operation of the parameter setting processing in Step S303 shown in FIG. 3. Such an operation is different from that of the flowchart which has been described by using FIG. 9 in the first embodiment.

Hereinafter, the operation of the parameter setting processing in Step S303 according to the second embodiment will be described which is different from that according to the first embodiment.

[2-2-1. Operation of Calibration Processing]

FIG. 12 is a schematic view, illustrated by using video images, of an example of the calibration processing which is performed by additional-information display system 110 according to the second embodiment.

Figure 13:
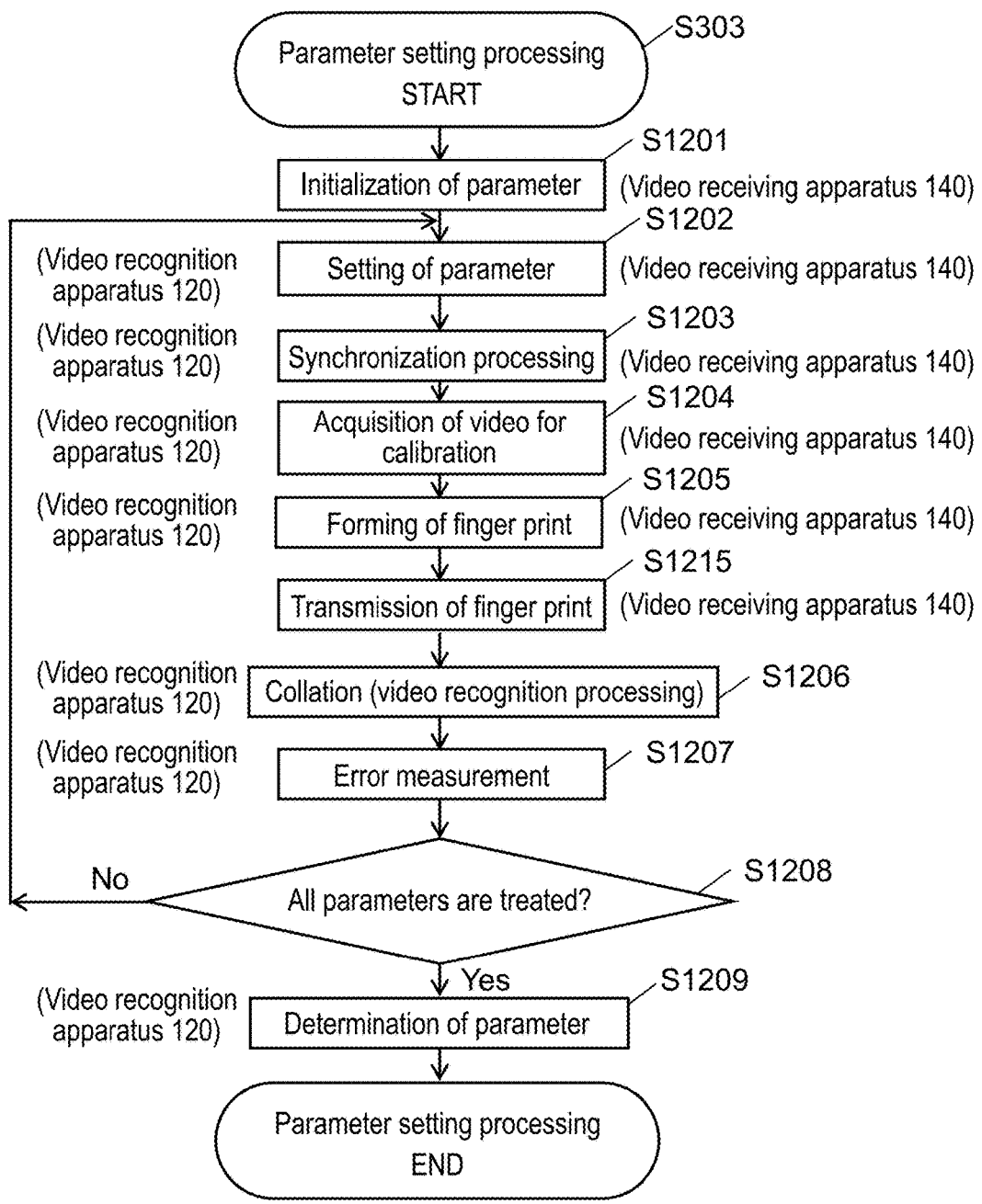
FIG. 13 is a schematic flowchart of an example of an operation of parameter setting processing which is performed by the additional-information display system according to the second embodiment.

FIG. 13 is a schematic flowchart of an example of the operation of the parameter setting processing which is performed by additional-information display system 110 according to the embodiment.

Figure 14:
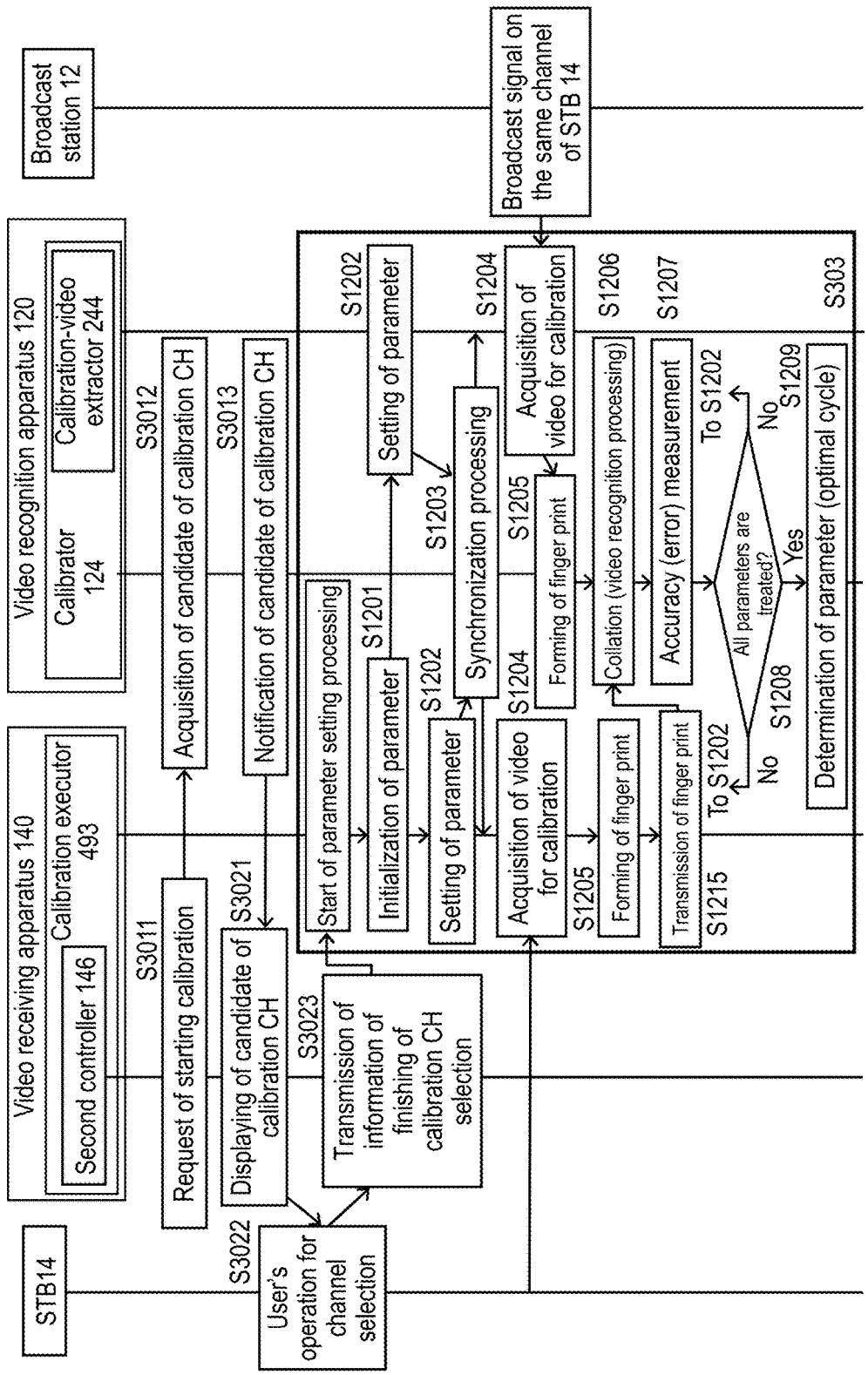
FIG. 14 is a flowchart illustrating the flowchart shown in FIG. 13, in which the operations of a video receiving apparatus and a video recognition apparatus are separately shown.

FIG. 14 is a flowchart illustrating the flowchart shown in FIG. 13, in which the operations of video receiving apparatus 140 and video recognition apparatus 120 are separately shown.

Hereinafter, a description of the flowchart shown in FIG. 13 will be made, together with descriptions of FIGS. 12 and 14.

In the embodiment, as schematically shown in FIG. 12, the parameter is set by the calibration processing, with the parameter determining a cut-out cycle of the partial video performed by video extractor 45.

In the following example, an operation will be described in which three parameters "a," "b," and "c" are prepared in advance, and one of the three is selected by the calibration processing. Parameter "a" is set such that the cutout cycle of the partial video is relatively short (that is, resulting in a relatively large amount of the data transmitted from video receiving apparatus 140 to video recognition apparatus 120). Parameter "c" is set such that the cutout cycle of the partial video is relatively long (that is, resulting in a relatively small amount of the data transmitted). Parameter "b" is set such that the cutout cycle is in between those for parameters "a" and "c." It is noted, however, that the number of the parameters according to the embodiment is not limited to three; the number may be not smaller than four, or alternatively two.

As described above, when the change in the video signal inputted from STB 14 to video receiving apparatus 140 is relatively small compared to the original video signal broadcasted from broadcast station 12, video receiving apparatus 140 is allowed to select parameter "c," leading to the relatively small amount of the data transmitted from video receiving apparatus 140 to video recognition apparatus 120.

In contrast, when the change is relatively large, video receiving apparatus 140 preferably selects either parameter "a" or "b," which leads to the relatively large amount of the data transmitted from video receiving apparatus 140 to video recognition apparatus 120, thereby increasing the accuracy of the video recognition processing performed by video recognition apparatus 120.

FIG. 13 shows the flowchart illustrating the procedure of setting the parameter.

Note that, in addition to the flowchart shown in FIG. 13, FIG. 14 shows the flowchart that illustrates Steps S301 and S302, in more detail, both shown in FIG. 3. First, these steps will be described below.

Second controller 146 of video receiving apparatus 140 instructs controller 141 to transmit the information indicating the request for starting the calibration (Step S3011).

Upon receiving the information, calibrator 124 of video recognition apparatus 120 extracts channel candidates from calibration-CH data base 243, with the candidates being usable (receivable by STB 14) for the calibration processing performed by video receiving apparatus 140 (Step S3012).

Calibrator 124 of video recognition apparatus 120 transmits the information indicating the extracted channel candidates to video receiving apparatus 140. Second controller 146 of video receiving apparatus 140 receives the information (Step S3013).

These Steps S3011, S3012, and S3013, as a whole, correspond to Step S301 shown in FIG. 3 in the first embodiment.

Upon receiving the information transmitted from video recognition apparatus 120, calibration executor 493 of video receiving apparatus 140 instructs controller 141 to display, on display device 54, the following items: That is, channel information contained in the received information and a message prompting a user to change the STB 14's channel to the channel (channel for calibration) in order to perform the calibration processing (Step S3021).

After the STB 14's channel has been changed to the channel (channel for calibration) usable in the calibration processing, when a user's operation is performed indicating the completion of changing the channel, and yet when a user's operation is performed indicating which channel the user selects, operation-signal receiver 43 of video receiving apparatus 140 accepts these user's operations (Step S3022).

Then, second controller 146 of video receiving apparatus 140 instructs controller 141 to transmit, to video recognition apparatus 120, both information (data) indicating the completion of changing the channel to the channel for calibration and information (data) indicating which channel is selected (Step S3023).

These Steps S3021, S3022, and S3023, as a whole, correspond to Step S302 shown in FIG. 3 in the first embodiment.

Next, calibration executor 493 of video receiving apparatus 140 starts the parameter setting processing in cooperation with video recognition apparatus 120.

First, calibration executor 493 of video receiving apparatus 140 initializes the parameter (Step S1201).

The initialization of the parameter is to select one from the plurality of the parameters which have been prepared in advance. Here, it is assumed that parameter "a" is selected by the initialization of the parameter, for example; however, another parameter other than parameter "a" may be selected. Then, the information indicating the selected parameter is transmitted from video receiving apparatus 140 to video recognition apparatus 120.

Next, the parameter (e.g. parameter "a") selected in Step S1201 is set, as the parameter to be used in the video recognition processing to be performed hereafter, in each of calibration executor 493 of video receiving apparatus 140 and calibrator 124 of video recognition apparatus 120 (Step S1202).

Next, calibration executor 493 and calibrator 124 perform synchronization processing (Step S1203).

The synchronization processing as referred herein is processing in which the following two timings are adjusted to be in coincidence with each other. That is, one is the timing of the fingerprint of the partial video for the calibration transmitted from video receiving apparatus 140 to video recognition apparatus 120. The other is the timing of the fingerprint which is formed, by video recognition apparatus 120, from the video received on the channel for calibration. That is, the synchronization processing is the processing of adjusting both timings to be in coincidence with each other, thereby allowing the comparison between the two fingerprints formed from the same video when the video recognition processing is performed.

Note that it is assumed here that these fingerprints are formed from the videos on the same channel for calibration.

The synchronization processing may be performed in such a manner as follows: For example, the calibration processing shown in the first embodiment is performed in advance, and a time difference is detected between the video signal inputted to video receiving apparatus 140 from STB 14 and the video signal of the broadcast signal received by video recognition apparatus 120 from broadcast station 12. Then, the result of the detection is used in the synchronization processing.

Next, calibration-video extractor 244 of video recognition apparatus 120 acquires the video signal to be used in the video recognition processing, from the broadcast signal on the channel for calibration which is received by video recognition apparatus 120, with the thus-acquired video signal being equal in duration to the partial video. For example, when the duration of the partial video is 2 seconds, calibration-video extractor 244 regards a video signal lasting continuously for 2 seconds as one unit, and continuously acquires the video signal for 2 seconds from the received broadcast signal. Video extractor 45 of video receiving apparatus 140 cuts out the partial video from the video signal inputted from STB 14, at the cycle based on the parameter (e.g. parameter "a") set in Step S1202. When the duration of the partial video is set to be e.g. 2 seconds, and yet when the cycle based on the parameter is e.g. 2 seconds, video extractor 45 regards the video signal lasting continuously for 2 seconds as one partial video, and cuts out the partial video from the inputted video signal at the cycle of 2 seconds (Step S1204).

Because both calibrator 124 of video recognition apparatus 120 and calibration executor 493 of video receiving apparatus 140 have performed the synchronization processing in Step S1203, the following two signals are equal in timing to each other, and express the same content. That is, one is the video signal (e.g. the video signal lasting continuously for 2 seconds) acquired by calibration-video extractor 244 of video recognition apparatus 120, and the other is the video signal (e.g. the video signal lasting continuously for 2 seconds) of the partial video acquired by video extractor 45 of video receiving apparatus 140.

Next, calibration-data former 242 of video recognition apparatus 120 forms the fingerprint from the video signal acquired by calibration-video extractor 244. Controller 141 of video receiving apparatus 140 forms the fingerprint from the partial video acquired by video extractor 45 (Step S1205).

The fingerprint formed by video receiving apparatus 140 in Step S1205 is transmitted from video receiving apparatus 140 to video recognition apparatus 120, and received by video recognition apparatus 120 (Step S1215).

In calibration-comparative retriever 241 of video recognition apparatus 120, the fingerprint received by video recognition apparatus 120 in Step S1215 is collated with the fingerprint formed by calibration-data former 242 in Step S1205 (Step S1206). Thus, video recognition apparatus 120 performs the video recognition processing for calibration.

When the two fingerprints are compared in Step S1206, the degree of agreement between the two is determined as an error translating into numerics (Step S1207). For the perfect agreement between the two fingerprints, the error is determined to be e.g. 0 (zero) %. For no agreement between the two fingerprints, the error is determined to be e.g. 100%. This operation is repeated predetermined times. Then, the best error value among the error values is employed as the final error value in Step S1207, for example. The best error value means the lowest value of the error among them.

For example, let the predetermined time period be 12 seconds, let the duration of one partial video be 2 seconds, and let the cutout cycle of the partial videos based on the parameter set in Step S1202 be 2 seconds, then the number of times of the video recognition processing during the predetermined time period is 6. In this way, a plurality of the times of the video recognition processing is performed to determine a plurality of the errors. Then, the best error value, for example, among them is determined as the final error value.

The thus-determined error is stored in calibration-storage device 245, as the result of the evaluation of the parameter set in Step S1202, with the stored error being associated with the parameter.

When this processing is performed properly, video recognition apparatus 120 may transmit, to video receiving apparatus 140, information indicating that the processing has been performed properly.

Note, however, that the procedure for calculating the error is not limited to that described above. For example, the final error may be determined by using the arithmetic mean or mode of the resulting values of the collations performed plural times, the median value of the distribution of the resulting values, or other statistical procedures.

All of the Steps from S1202 to S1207 are repeated a predetermined number of times, with the number being equal to the number of the parameters prepared in advance (Step S1208).

For example, when additional two parameters "b" and "c" other than parameter "a" have been prepared in advance, all of the Steps from S1202 to S1207 are further repeated 2 times. In the second round, parameter "b" is set in Step S1202. When parameter "b" is a cycle of e.g. 4 seconds, video extractor 45 cuts out a partial video lasting continuously for e.g. 2 seconds from the input video signal at the cycle of 4 seconds (that is, the 2-second partial videos are cut out at 2-second regular intervals) in Step S1204. Then, in Step S1207, in the case of the predetermined time being e.g. 12 seconds, the video recognition processing is performed 3 times during the predetermined time, and the final error is determined based on the result of the thus-repeated processing.

Moreover, in the third round, when parameter "c" is set in Step S1202. When parameter "c" is a cycle of e.g. 6 seconds, video extractor 45 cuts out a partial video lasting continuously for e.g. 2 seconds from the input video signal at the cycle of 6 seconds (that is, the 2-second partial videos are cut out at 4-second regular intervals) in Step S1204. Then, in Step S1207, when the predetermined time is e.g. 12 seconds, the video recognition processing is repeated 2 times during the predetermined time, and the final error is determined based on the result of the thus-repeated processing.

After all of the Steps from S1202 to S1207 have been repeated the predetermined number of times, with the number being equal to the number of the parameters prepared in advance, the result of the evaluation for each of the parameters prepared in advance is stored in calibration-storage device 245.

Calibration controller 256 compares these evaluation results, and determines the final parameter based on the result of the comparison (Step S1209).

For example, when the error calculated in Step S1207 for each of the parameters is smaller than a predetermined threshold value for each of the parameters, calibration controller 256 determines that the video recognition processing can be performed highly accurately even if the cutout cycle of the partial video is lengthened and yet even if the times (times per predetermined time) of the video recognition processing is reduced. Then, the calibration controller employs parameter "c," for example, as the final parameter. Moreover, for example, when the error calculated in Step S1207 for each of the parameters is not smaller than the predetermined threshold value for each of the parameters, calibration controller 256 determines that the high accuracy of the video recognition processing cannot be achieved unless the cutout cycle of the partial video is shortened and yet unless the times (times per predetermined time) of the video recognition processing is increased. Then, the calibration controller employs parameter "a," for example, as the final parameter. Furthermore, for example, when the errors calculated in Step S1207 include one not smaller than the corresponding predetermined threshold and one smaller than the corresponding predetermined threshold, calibration controller 256 employs parameter "b," for example, as the final parameter.

In this way, calibration controller 256 compares the results of the evaluations performed, one for each of the plurality of the parameters prepared in advance, thereby determining the final parameter such that the video recognition processing can be performed highly accurately and that both the loads and the amount of communication data can be reduced in the video recognition processing.

The parameter determined in Step S1209 is stored in calibration-storage device 245 and transmitted from video recognition apparatus 120 to video receiving apparatus 140 where the parameter is stored in second storage device 492 of video receiving apparatus 140. The parameter stored in second storage device 492 is used in the video recognition processing to be consecutively performed. At the cycle based on the parameter, video extractor 45 cuts out the partial videos.

[2-3. Effect and Others]

In this way, in the embodiment, video recognition apparatus 120 is configured to set, in cooperation with video receiving apparatus 140, the parameter relating to the extraction cycle of the partial videos performed by video extractor 45, and to transmit the thus-set parameter to video receiving apparatus 140. Video extractor 45 is configured to extract the partial videos from the video signal in the cycle based on the parameter.

The cutout cycle of the partial videos performed by video receiving apparatus 140 is substantially equal to the cycle at which video receiving apparatus 140 requests video recognition apparatus 120 to perform the video recognition processing. That is, this cutout cycle substantially equals the cycle at which video recognition apparatus 120 performs the video recognition processing.

With this configuration, it is possible to set the cutout cycle of the partial videos performed by video extractor 45, with the cutout cycle substantially equaling the cycle of performing the video recognition processing. This cutout cycle is set in accordance with the degree of the change, that is, how much the video signal inputted to video receiving apparatus 140 from STB 14 is changed from the original video signal transmitted from broadcast station 12.

Therefore, when the degree of the change is so relatively small that the video recognition processing can be performed highly accurately, the cutout cycle of the partial videos can be lengthened to reduce the loads on video recognition apparatus 120 in performing the video recognition processing and to reduce the amount of the data for requesting the video recognition processing, with the data being transmitted from video receiving apparatus 140 to video recognition apparatus 120. Moreover, when the degree of the change is so relatively large that a drop in accuracy of the video recognition processing is expected, it is possible to shorten the cutout cycle of the partial videos, which substantially equals the cycle of the request for the video recognition processing from video receiving apparatus 140 to video recognition apparatus 120. This shortening allows high accuracy in performing the video recognition processing. Such a relatively large change can occur in situations, for example, where the reception environment of the broadcast signal at STB 14 is not so good that the received signal is attenuated and its signal-to-noise ratio is reduced, or where STB 14 superimposes some information on the video signal before outputting the signal.

Other Exemplary Embodiments

As described above, the first and second embodiments have been described to exemplify the technology disclosed in the present application. However, the technology is not limited to these embodiments, and is also applicable to embodiments that are subjected to various changes and modifications, replacements, additions, omissions, and the like. Moreover, the technology disclosed herein also allows another embodiment which is configured by combining the appropriate constituent elements in the first and second embodiments described above.

Given these circumstances, other exemplary embodiments will be described hereinafter.

In the first embodiment, the description has been made using the configuration in which the parameter setting processing is started after that display device 54 has displayed the message prompting the user to change the STB 14's channel to the channel for calibration and that the user has changed the channel. However, the present disclosure is not limited to this configuration. For example, the parameter setting processing may be started after the following operations.

Figure 15:
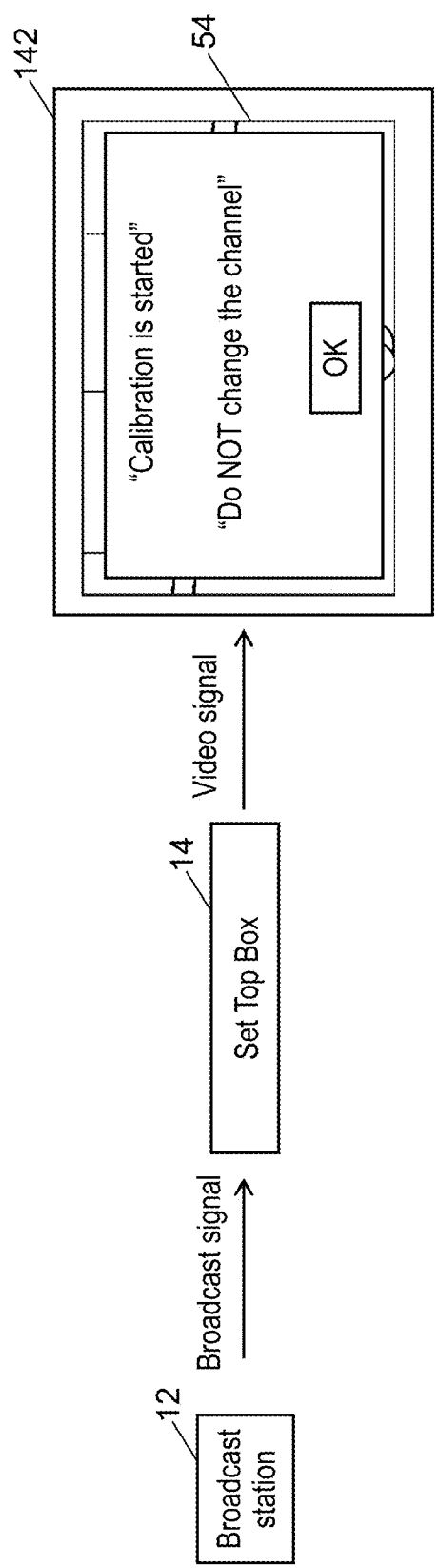
FIG. 15 is a schematic view of an example of a message which is displayed on a display device of a video receiving apparatus according to another embodiment.

FIG. 15 is a schematic view of an example of a message which is displayed on display device 54 of video receiving apparatus 142 according to another embodiment.

Figure 16:
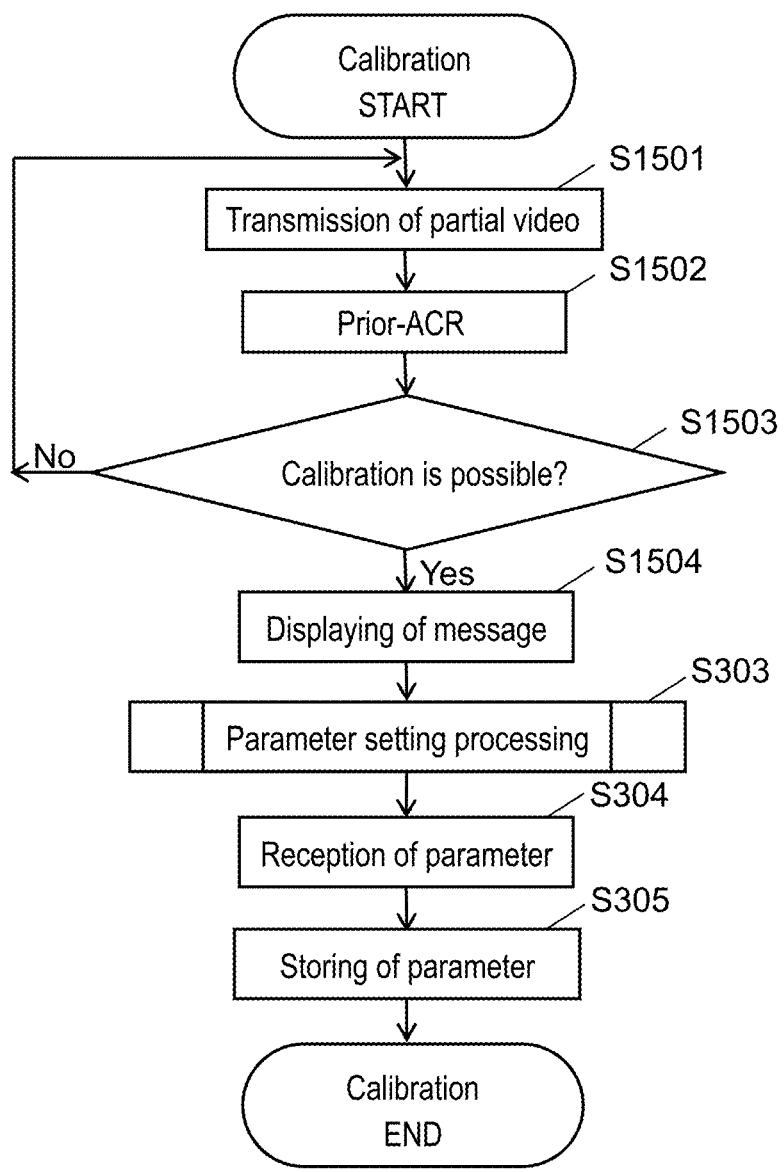
FIG. 16 is a schematic flowchart of an example of an operation of calibration processing which is performing by the video receiving apparatus according to the another embodiment.

FIG. 16 is a schematic flowchart of an example of the operation of the calibration processing which is performing by video receiving apparatus 142 according to the another embodiment.

Hereinafter, a description of the flowchart shown in FIG. 16 will be made, together with a description of FIG. 15. Note that the flowchart shown in FIG. 16 is different from the flowchart shown in FIG. 3, in the steps up to the parameter setting processing in Step S303.

Upon receiving the video signal from STB 14, video receiving apparatus 142 cuts out the partial video from the video signal, and then transmits it to the video recognition apparatus so as to request the video recognition processing (Step S1501).

Upon receiving the partial video, the video recognition apparatus forms a fingerprint from the partial video, thereby performing the video recognition processing (Step S1502).

That is, the video recognition apparatus collates the fingerprint of the partial video received from video receiving apparatus 142 with the fingerprints, stored in the calibration-storage device, that are formed from the video signal of the broadcast signal received on the channel for calibration.

Note that, in the embodiment, because the video recognition processing is performed in situations where the calibration processing has yet to be performed, the video recognition processing is abbreviated as "prior-ACR."

Then, the video recognition apparatus determines whether or not the partial video received from video receiving apparatus 142 is the video on the channel for the calibration (Step S1503). With this operation, the video recognition apparatus determines whether or not the video signal being currently inputted to video receiving apparatus 142 from STB 14 is the video signal usable in the calibration processing.

Note that the video recognition apparatus may transmit the result of the prior-ACR to video receiving apparatus 142, and instruct video receiving apparatus 142 to display a message on display device 54 of video receiving apparatus 142. The message is intended to request the user to check whether the result of the prior-ACR is correct. This message may be something like, for example: "Is the viewing program on channel ##? If YES, please press button XX. If NOT, please press button YY."

When it is determined that the video signal being inputted from video receiving apparatus 142 is not the video signal received on the channel for the calibration (NO) in Step S1503, the process returns back to Step S1501 and repeats the series of the successive processes.

When it is determined that the video signal being inputted from video receiving apparatus 142 is the video signal received on the channel for the calibration (YES) in Step S1503, the video recognition apparatus instructs video receiving apparatus 142 to display a message to notify the user of the start of the calibration processing. Upon receiving the instruction, video receiving apparatus 142 follows the instruction and displays the message on display device 54 (Step S1504).

In Step S1504, the message is displayed on display device 54 of video receiving apparatus 142, as shown in FIG. 15 for example. This message may be something like: "Calibration is started", "Do NOT change the channel".

It is noted, however, that Step S1504 may be omitted such that the message is not displayed in order not to disturb the user in viewing the video.

Then, the parameter setting processing in Step S303 is started.

All the steps subsequent to Step S303 are substantially identical to those described in the first and second embodiments; therefore, their descriptions are omitted.

In the embodiment, the calibration processing can be performed without requesting the user to change the channel.

In the first and second embodiments, the descriptions have been made by using the configuration in which the video receiving apparatus includes display device 54; however, the video receiving apparatus according to the present disclosure is not limited to the configuration. The video receiving apparatus may include no display devices.

Figure 17:
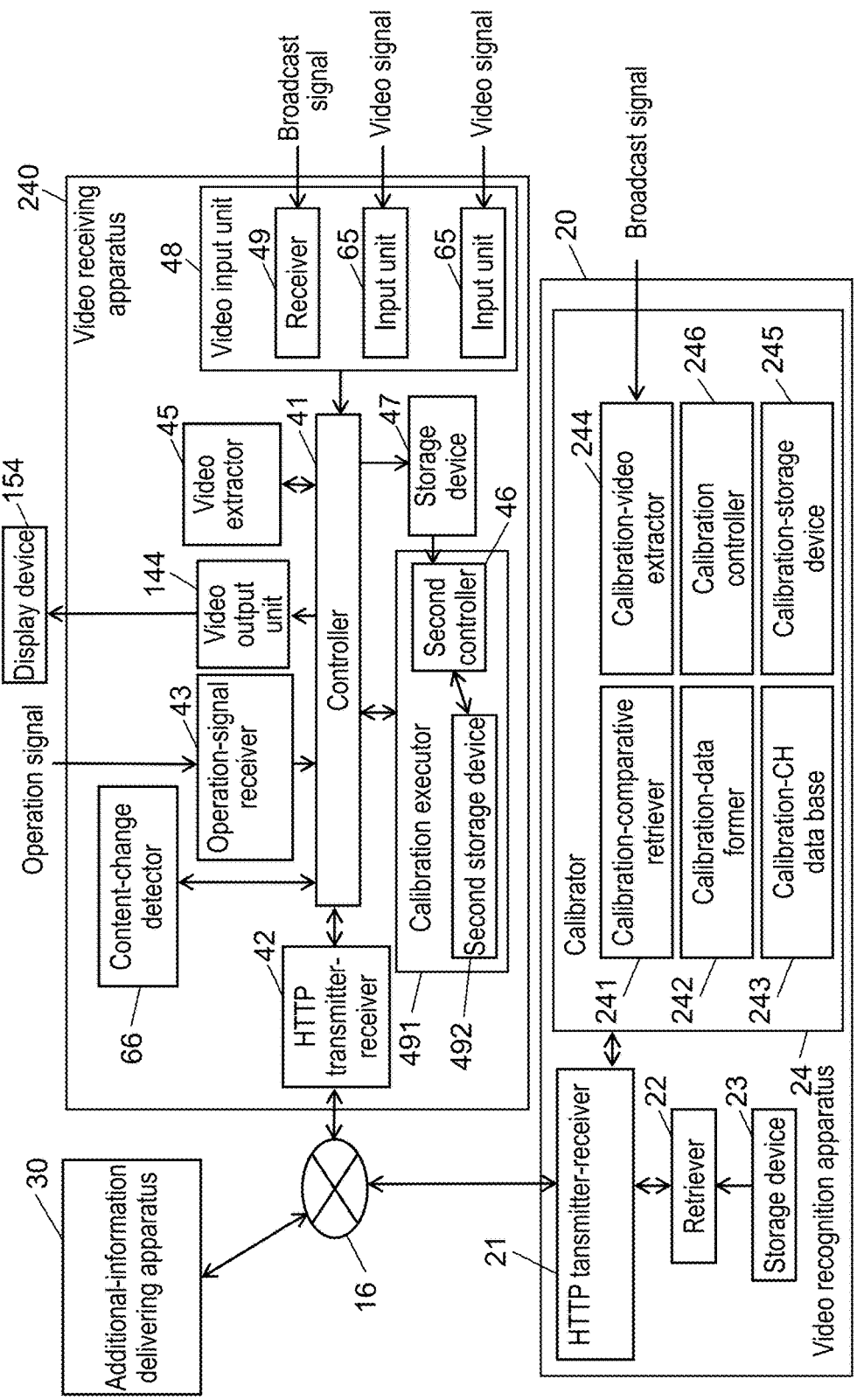
FIG. 17 is a schematic block diagram of an example of a configuration of the video receiving apparatus according to the another embodiment.

FIG. 17 is a schematic block diagram of an example of a configuration of video receiving apparatus 240 according to the another embodiment. Video receiving apparatus 240 shown in FIG. 17 does not include display device 54, and is different from video receiving apparatus 40 shown in FIG. 2 in the first embodiment (or video receiving apparatus 140 shown in FIG. 10 in the second embodiment) in that video output unit 144 is configured to output the video signal to video display apparatus 154 installed on the outside, by wired or wireless communications.

Among examples of such video receiving apparatus 240 is a video-recording apparatus, for example, which is provided with a video-recording function, broadcast-signal receiving function, video-signal inputting function, and video-signal outputting function. The video-recording apparatus is configured to transmit the video signal to video display apparatus 154 installed on the outside. Such video-recording apparatuses include, for example, hard-disk recorders, DVD recorders, and BD recorders.

Note that, in the first and second embodiments, the descriptions have been made concerning the operation where STB 14 receives the broadcast signal and outputs the video signal. However, even in the case where the video receiving apparatus receives the broadcast signal and displays the video of the broadcast signal, it is possible to perform the calibration processing the same as those described in the first and second embodiments. In this case, the controller, for example, of the video receiving apparatus may change the channel to the channel for the calibration, without displaying the message to prompt the user to change the channel to the channel for calibration.

Note that the flowcharts described in the first and second embodiments are nothing more than examples of the operation; therefore, the order of the steps may be changed.

Note that, in the first and second embodiments, the descriptions of the operations have been made regarding the assumed case where the broadcast channels are different in each region. However, the configuration according to the embodiment is applicable even in cases where the additional-information display system is configured to be able to operate independently of regions. Such cases include: a situation where a moving image is delivered to the video receiving apparatus via communications network 16, and a situation where a moving image file is downloaded to the video receiving apparatus via communications network 16.

It is noted, however, that each of the constituent elements described in the embodiments may be configured with an independent dedicated circuit or, alternatively, configured to be implemented by executing, with a processor, a program formed for performing one or a plurality of the operations of each of the constituent elements. Moreover, such programs may be acquired by downloading from a server or acquired via a designated record medium (for example, an optical disk such as CD-ROM, a magnetic disk, a semiconductor memory, or the like).

Moreover, each of the operations of the server described in the embodiments may be performed by centralized processing with a single server, or by decentralized processing with a plurality of servers.

The specific numeric values described in the first and second embodiments are nothing more than examples in the embodiments; therefore, the present disclosure is not limited to these numeric values. Each of the numeric values is preferably set to be an optimal one in accordance with, such as, specifications of the video receiving apparatus.

INDUSTRIAL APPLICABILITY

The technology according to the present disclosure is applicable to video receiving apparatuses which can acquire additional information associated with video signals inputted from video transmitting apparatuses installed on the outside, and can superimpose the acquired additional information on the video signals. More specifically, the technology is applicable to apparatuses including: television receivers, hard-disk recorders, DVD recorders, and BD recorders.

REFERENCE MARKS IN THE DRAWINGS 10, 110 additional-information display system
12 broadcast station
14, 14a, 14b STB
16 communications network
20, 120 video recognition apparatus
21, 42 HTTP transmitter-receiver
22 retriever
23, 47 storage device
24, 124 calibrator
30 additional-information delivering apparatus
40, 40a, 40b, 140, 142, 240 video receiving apparatus
41, 141 controller
43 operation-signal receiver
44, 144 video output unit
45 video extractor
46, 146 second controller
48, 48a, 48b video input unit
49 receiver
51 additional information
54 display device
61 relay installation
65 input unit
66 content-change detector
154 video display apparatus
241 calibration-comparative retriever
242 calibration-data former
243 calibration-CH data base
244 calibration-video extractor
245 calibration-storage device
246, 256 calibration controller
491, 491a, 491b, 493 calibration executor
492 second storage device

The invention claimed is:

1. A video receiving apparatus capable of transmitting and receiving data via a communications network, the apparatus comprising:
an input unit for being input with a video signal;
a video extractor for extracting a partial video, which is to be used for video recognition processing, from the video signal;
a controller for transmitting, to a video recognition apparatus connected to the communications network, the partial video or content recognition information formed from the partial video, requesting the video recognition apparatus to perform the video recognition processing, acquiring a result of the video recognition processing from the video recognition apparatus, and acquiring additional information based on the result of the video recognition processing from an additional-information delivering apparatus connected to the communications network;
a calibration executor for performing calibration processing in cooperation with the video recognition apparatus, and setting a predetermined parameter; and
a display device for displaying a video having the additional information superimposed on the video signal,
wherein the calibration executor receives information indicating a candidate of a channel for calibration, the information being transmitted from the video recognition apparatus, and the calibration executor displays, on the display device, the candidate of the channel for the calibration together with a message prompting a user to change a channel to any one of the candidates of the channel for the calibration.

2. The video receiving apparatus according to claim 1, wherein the calibration executor receives and stores the parameter, as a result of the calibration processing, transmitted from the video recognition apparatus.

3. The video receiving apparatus according to claim 1, wherein the calibration executor transmits, to the video recognition apparatus, a request for starting the calibration processing and regional information usable for identifying a region in which the video receiving apparatus is installed; and
the calibration executor receives information indicating the candidate of the channel for the calibration, the candidate being based on the regional information, the information being transmitted from the video recognition apparatus.

4. The video receiving apparatus according to claim 1, further comprising an operation-signal receiver for receiving a user's operation indicating completion of changing the channel.

5. The video receiving apparatus according to claim 1, wherein the parameter is data indicating a time difference between reception time of the partial video received by the video recognition apparatus and acquisition time of the video signal acquired by the video recognition apparatus, the video signal corresponding to the partial video.

6. The video receiving apparatus according to claim 5, wherein the controller transmits, to the video recognition apparatus, the parameter together with one of the partial video and the content recognition information, and requests the video recognition apparatus to perform the video recognition processing.

7. The video receiving apparatus according to claim 1, wherein the parameter is data relating to an extraction cycle of the partial video extracted by the video extractor; and
the video extractor extracts the partial video from the video signal in the extraction cycle based on the parameter.

8. A method of setting a parameter in a video receiving apparatus capable of transmitting and receiving data via a communications network, the method comprising the steps of:

extracting a partial video, which is to be used for video recognition processing, from a video signal inputted from an outside;

transmitting, to a video recognition apparatus, one of the partial video and content recognition information formed from the partial video, requesting the video recognition apparatus to perform the video recognition processing, and acquiring a result of the video recognition processing from the video recognition apparatus connected to the communications network;

acquiring additional information based on the result of the video recognition processing from an additional-information delivering apparatus connected to the communications network;

performing calibration processing in cooperation with the video recognition apparatus and setting a predetermined parameter; and receiving information transmitted from the video recognition apparatus, the information indicating a candidate of a channel for calibration;

displaying the candidate of the channel for the calibration on a display device; and displaying a message prompting a user to change a channel to any one of the candidates of the channel for the calibration.

9. The method of setting the parameter according to claim 8, further comprising the step of receiving and storing the parameter transmitted from the video recognition apparatus, the parameter being a result of the calibration processing.

10. The method of setting the parameter according to claim 8, further comprising the steps of:
transmitting, to the video recognition apparatus, a request for starting the calibration processing and regional information usable for identifying a region in which the video receiving apparatus is installed,
receiving information transmitted from the video recognition apparatus, the information indicating the candidate of the channel for the calibration, the candidate being based on the regional information.

11. The method of setting the parameter according to claim 8, further comprising the step of receiving a user's operation indicating completion of changing the channel, wherein the calibration processing is started after receiving the user's operation.

12. An additional-information display system, comprising:
a video receiving apparatus;
a video recognition apparatus; and
an additional-information delivering apparatus,
wherein the video receiving apparatus, the video recognition apparatus, and the additional-information delivering apparatus are capable of transmitting and receiving data to and from each other via the communications network,
the video receiving apparatus including:
an input unit for being input with a video signal;
a video extractor for extracting a partial video, which is to be used for video recognition processing, from the video signal;
a controller for transmitting, to the video recognition apparatus via the communications network, the partial video or content recognition information formed from the partial video, requesting the video recognition apparatus to perform the video recognition processing, acquiring a result of the video recognition processing from the video recognition apparatus via the communications network, and acquiring additional information based on the result of the video recognition processing from the additional-information delivering apparatus via the communications network;
a calibration executor for performing calibration processing in cooperation with the video recognition apparatus and setting a predetermined parameter; and
a display device for displaying a video having the additional information superimposed on the video signal, wherein;
the calibration executor receives information indicating a candidate of a channel for calibration, the information being transmitted from the video recognition apparatus, and displays, on the display device, the candidate of the channel for the calibration together with a message prompting a user to change a channel to any one of the candidates of the channel for the calibration,
the video recognition apparatus transmits the information indicating the candidate of the channel for the calibration to the video receiving apparatus via the communications network, performs the video recognition processing relating to the partial video received via the communications network, transmits the result of the video recognition processing to the video receiving apparatus via the communications network, performs the calibration processing in cooperation with the video receiving apparatus, sets the predetermined parameter, and transmits the parameter to the video receiving apparatus, and
the additional-information delivering apparatus transmits, to the video receiving apparatus via the communications network, the additional information corresponding to the result of the video recognition processing, the result being received via the communications network.

13. The additional-information display system according to claim 12,
wherein the calibration executor of the video receiving apparatus transmits, to the video recognition apparatus, a request for starting the calibration processing and regional information usable for identifying a region in which the video receiving apparatus is installed; and
the video recognition apparatus selects the candidate of the channel for calibration from a calibration-channel data base, based on the regional information, and transmits the candidate to the video receiving apparatus.

14. The additional-information display system according to claim 12,
wherein the video recognition apparatus sets a parameter and transmits the parameter to the video receiving apparatus, the parameter indicating a time difference between reception time of the partial video received by the video recognition apparatus and acquisition time of a video signal acquired by the video recognition apparatus, the partial video being transmitted from the video receiving apparatus, the video signal corresponding to the partial video; and
the calibration executor of the video receiving apparatus stores the received parameter and transmits, to the video recognition apparatus, the parameter together with one of the partial video and the content recognition information when the video recognition processing is requested.

15. The additional-information display system according to claim 12,
- wherein the video recognition apparatus sets a parameter indicating an extraction cycle of the partial video and transmits the parameter to the video receiving apparatus; and
- the calibration executor of the video receiving apparatus instructs the video extractor to extract the partial video from the video signal in the extraction cycle based on the received parameter.

16. The additional-information display system according to claim 12,
- wherein the video signal inputted to the input unit of the video receiving apparatus during the calibration processing is a video signal of a broadcast signal on a channel for calibration; and
- a broadcast signal received by the video recognition apparatus is the broadcast signal on the channel for the calibration.

17. The additional-information display system according to claim 12,
- wherein the video recognition apparatus determines whether one of the partial video and the content recognition information is formed from a broadcast signal on a channel for calibration, the partial video and the content recognition information being transmitted from the video receiving apparatus;
- the video recognition apparatus transmits a result of the determination to the video receiving apparatus and starts the calibration processing based on the result of the determination; and
- the video receiving apparatus displays, on a display device, a message based on the received result of the determination.

* * * * *